US008531939B2

(12) United States Patent      (10) Patent No.: US 8,531,939 B2
Yoon et al.      (45) Date of Patent: Sep. 10, 2013

(54) APPARATUS AND METHOD FOR TRANSMITTING AND RECEIVING OF CYCLIC SHIFT PARAMETER FOR SUPPORTING ORTHOGONALITY IN MIMO ENVIRONMENT

(75) Inventors: Sungjun Yoon, Seoul (KR); Kyoung-min Park, Goyang-si (KR)

(73) Assignee: Pantech Co., Ltd., Seoul (KR)

( * ) Notice: Subject to any disclaimer, the term of this patent is extended or adjusted under 35 U.S.C. 154(b) by 197 days.

(21) Appl. No.: 13/099,500

(22) Filed: May 3, 2011

(65) Prior Publication Data

US 2011/0267972 A1    Nov. 3, 2011

(30) Foreign Application Priority Data

May 3, 2010 (KR) .......................... 10-2010-0041403

(51) Int. Cl.
     *H04J 11/00* (2006.01)
(52) U.S. Cl.
     USPC .......................................... 370/203; 370/252
(58) Field of Classification Search
     USPC ................. 370/203, 208, 252, 328, 335–336, 370/342–343, 345, 400–401, 465
     See application file for complete search history.

(56) References Cited

U.S. PATENT DOCUMENTS

| | | | | |
|---|---|---|---|---|
| 7,738,437 | B2 * | 6/2010 | Ma et al. | 370/342 |
| 7,952,991 | B2 * | 5/2011 | Kim et al. | 370/210 |
| 2009/0168730 | A1 * | 7/2009 | Baum et al. | 370/336 |
| 2009/0279493 | A1 | 11/2009 | Gaal et al. | |
| 2011/0188447 | A1 * | 8/2011 | Wang et al. | 370/328 |
| 2011/0222393 | A1 * | 9/2011 | Kwak et al. | 370/208 |
| 2011/0228728 | A1 * | 9/2011 | Baligh et al. | 370/328 |
| 2011/0243066 | A1 * | 10/2011 | Nayeb Nazar et al. | 370/328 |
| 2012/0008556 | A1 * | 1/2012 | Noh et al. | 370/328 |
| 2012/0014318 | A1 * | 1/2012 | Luo et al. | 370/328 |
| 2012/0250663 | A1 * | 10/2012 | Han et al. | 370/336 |

FOREIGN PATENT DOCUMENTS

EP      2056515      5/2009

OTHER PUBLICATIONS

International Search Report for corresponding PCT Application No. PCT/KR2011/003320 dated Jan. 2, 2012, pp. 1-5.
Written Opinion for corresponding PCT Application No. PCT/KR2011/003320 dated Jan. 2, 2012, pp. 1-4.

* cited by examiner

*Primary Examiner* — Kevin Mew
(74) *Attorney, Agent, or Firm* — H.C. Park & Associates, PLC

(57) ABSTRACT

A method includes: determining a Cyclic Shift (CS) parameter that implicitly indicates an orthogonality allocation rule and orthogonality-related information, by determining a multiple access state of a User Equipment (UE), and transmitting the determined CS parameter to the UE, wherein the orthogonality-related information includes an Orthogonal Cover Code indicated by the CS parameter, the orthogonality allocation rule is determined as a uniform scheme or a non-uniform scheme according to the CS parameter, determining the CS parameter by which the non-uniform scheme is applied if the UE is in a Single User Multiple Input Multiple Output state, and determining the CS parameter by which the uniform scheme is applied if the UE is in a Multiple User Multiple Input Multiple Output state.

17 Claims, 12 Drawing Sheets

APPARATUS AND METHOD FOR TRANSMITTING AND RECEIVING OF CYCLIC SHIFT PARAMETER FOR SUPPORTING ORTHOGONALITY IN MIMO ENVIRONMENT

CROSS-REFERENCE TO RELATED APPLICATION

This application claims priority from and the benefit under 35 U.S.C. §119 of a Korean Patent Application No. 10-2010-0041403, filed on May 3, 2010, which is hereby incorporated by reference for all purposes as if fully set forth herein.

BACKGROUND

1. Field

Embodiments of the present invention relate to a wireless communication system, and more particularly, to an apparatus and a method for transmitting and receiving a cyclic shift parameter for supporting orthogonality in a Multiple Input Multiple Output (MIMO) environment.

2. Discussion of the Background

With the development of communication systems, a wide variety of wireless terminals are being used by consumers, such as business companies and individuals.

Current mobile communication systems, such as 3GPP (3rd Generation Partnership Project), LTE (Long Term Evolution), and LTE-A (LTE Advanced), may bring forth the development of technology for a high-speed large-capacity communication system, which can transmit or receive various data, such as images and wireless data, and thus beyond the capability of mainly providing a voice service, and can further transmit a large capacity of data in a wired communication network. Moreover, the mobile communication systems are being used with a proper error detection scheme, which can minimize the reduction of information loss and improve the system transmission efficiency, thereby improving the system performance.

Further, in various communication systems, various Reference Signals (RSs) are used to provide information on a communication environment, etc. to counterpart devices through an uplink or a downlink.

For example, in a Long Term Evolution (LTE) system, which is an evolved system for mobile communication, a User Equipment (UE) transmits an Uplink Demodulation Reference Signal (UL DM-RS) as a reference signal in each slot in order to obtain channel information for demodulation of a data channel at the time of uplink transmission. Further, a sounding reference signal is transmitted, as a channel estimation reference signal indicating the channel state of the UE, to a base station (eNodeB) transceiver, and a Cell-specific Reference Signal (CRS) is transmitted at each sub-frame in order to obtain channel information at the time of downlink transmission.

The reference signals as described above may be generated and transmitted by a UE if they are uplink reference signals and are generated and transmitted by a base station (eNodeB) transceiver if they are downlink reference signals.

Further, in the case of an uplink, reference signals are generated by generating a plurality of sequences through complex dimensional phase shifting using a predetermined cyclic shift.

However, there has been a recent demand for the use of more extended reference signals or sequences, in order to secure the flexibility of communication systems, etc.

SUMMARY

Exemplary embodiments of the present invention provide an apparatus and a method for transmitting and receiving a cyclic shift parameter for supporting orthogonality in a Multiple Input Multiple Output (MIMO) environment. Additional features of the invention will be set forth in the description which follows, and in part will be apparent from the description, or may be learned by practice of the invention.

An exemplary embodiment of the present invention discloses a method for transmitting a Cyclic Shift (CS) parameter, comprising determining a CS parameter which implicitly indicates an orthogonality allocation rule and orthogonality-related information, by determining a multiple access state of one or more User Equipments (UEs), and transmitting the determined CS parameter to the one or more UEs, wherein the orthogonality-related information comprises an Orthogonal Cover Code (OCC) indicated by the CS parameter, the orthogonality allocation rule is determined as a uniform scheme or a non-uniform scheme according to a set with at least one element to which the CS parameter belongs, if the non-uniform scheme is applied as the orthogonality rule, determining the at least one element as the CS parameter of the UE if the UE is in an SU-MIMO (Single User Multiple Input Multiple Output) state, and if the uniform scheme is applied as the orthogonality rule, determining the at least one element as the CS parameter of the UE if the UE is in an MU-MIMO (Multiple User Multiple Input Multiple Output) state.

An exemplary embodiment of the present invention provides a method for transmitting a Cyclic Shift (CS) parameter to a User Equipment (UE), which generates and transmits reference signals for N layers (N is an integer), the method comprising determining a CS parameter which implicitly indicates an Orthogonal Cover Code (OCC) used for generation of a reference signal for each layer, and transmitting the determined CS parameter to the UE, wherein the CS parameter is an element of a first set or a second set, an intersection between the first set and the second set is an empty set, and one element of the first set is determined as the CS parameter if a first OCC is identically allocated to a first layer and a second layer and another OCC different from the first OCC is identically allocated to a third layer and a fourth layer, and one element of the second set is determined as the CS parameter if one OCC is identically allocated to all the N layers.

An exemplary embodiment of the present invention provides a method for transmitting reference signals by a User Equipment (UE), which generates and transmits reference signals for N layers (N is an integer), the method comprising calculating a Cyclic Shift (CS) parameter value for a first layer from control information including a CS parameter received from an eNodeB, calculating a CS parameter value for each of other layers if the other layers are used in addition to the first layer, calculating an Orthogonal Cover Code (OCC) for the first layer from the CS parameter, calculating an OCC for each of the other layers if the other layers are used in addition to the first layer, generating a reference signal for the first layer by using the CS parameter value and the OCC for the first layer, generating a reference signal for each of the other layers by using a CS parameter value and an OCC for each of the other layers if the other layers are used in addition to the first layer, and transmitting the generated reference signal to the eNodeB, wherein the CS parameter is an element of a first set or a second set, an intersection between the first set and the second set is an empty set, and an OCC of a second layer is equal to an OCC of a first layer while OCCs of a third layer and a fourth layer are not equal to the OCC of the first layer if the CS parameter is an element of the first set, and one OCC is identically allocated to all the N layers if the CS parameter is an element of the second set.

An exemplary embodiment of the present invention provides a eNodeB apparatus to transmit a Cyclic Shift (CS) parameter to a User Equipment (UE), which generates and transmits reference signals for N layers (N is an integer), the eNodeB apparatus comprising a CS parameter determining unit to determine a CS parameter which implicitly indicates an Orthogonal Cover Code (OCC) used for generation of a reference signal for each layer, a signal generating unit to generate a signal for transmitting control information including the determined CS parameter to the UE, and a transceiving unit to transmit the signal to the UE and to receive a reference signal from the UE, wherein the CS parameter determined by the CS parameter determining unit is an element of a first set or a second set, an intersection between the first set and the second set is an empty set, and one element of the first set is determined as the CS parameter if a first OCC is identically allocated to a first layer and a second layer and another OCC different from the first OCC is identically allocated to a third layer and a fourth layer, and one element of the second set is determined as the CS parameter if one OCC is identically allocated to all the N layers.

An exemplary embodiment of the present invention provides a User Equipment (UE) apparatus, which generates and transmits reference signals for N layers (N is an integer), the UE apparatus comprising a receiving unit to receive control information that comprises a Cyclic Shift (CS) parameter from an eNodeB, a CS parameter extracting unit to calculate a CS parameter value for a first layer from the control information including the CS parameter, and to calculate a CS parameter value for each of other layers if the other layers are used in addition to the first layer, an orthogonality-related information calculating unit to calculate orthogonality-related information for the first layer from the CS parameter, and to calculate orthogonality-related information for each of the other layers if the other layers are used in addition to the first layer, a reference signal generating unit to generate a reference signal for the first layer by using the orthogonality-related information for the first layer and the CS parameter value for the first layer, and to generate a reference signal for each of the other layers by using orthogonality-related information for each of the other layers and a CS parameter value for each of the other layers if the other layers are used in addition to the first layer, and a transmitting unit to transmit the generated reference signal to the eNodeB, wherein the CS parameter is an element of a first set or a second set, an intersection between the first set and the second set is an empty set, and an Orthogonal Cover Code (OCC) of a second layer is equal to an OCC of a first layer while OCCs of a third layer and a fourth layer are not equal to the OCC of the first layer if the parameter is an element of the first set, and one OCC is identically allocated to all the N layers if the CS parameter is an element of the second set.

An exemplary embodiment of the present invention provides a method of a User Equipment (UE), which generates and transmits reference signals for N layers (N is an integer), in a system, the method comprising receiving control information including a Cyclic Shift (CS) parameter from an eNodeB, calculating a CS parameter value of a first layer according to the CS parameter included in the control information, and determining an Orthogonal Cover Code (OCC) and a CS parameter value for each layer by using the calculated CS parameter value of the first layer and an equation in consideration of a maximum of four layers, which is defined by determination of the CS parameter value for each layer (if the calculated CS parameter value is one of 0, 3, 6, and 9) $\{n_{DMRS}^{(2)}$ of the $1^{st}$ layer, $n_{DMRS}^{(2)}$ of the $2^{nd}$ layer, $n_{DMRS}^{(2)}$ of the $3^{rd}$ layer, $n_{DMRS}^{(2)}$ of the $4^{th}$ layer$\}=\{n_{DMRS}^{(2)}, (n_{DMRS}^{(2)}+6) \bmod 12, (n_{DMRS}^{(2)}+3) \bmod 12, (n_{DMRS}^{(2)}+9) \bmod 12\}$ determination of the OCC for each layer (if the calculated CS parameter value is one of 0, 3, 6, and 9) $\{n_{DMRS}^{OCC}$ of the $1^{st}$ layer, $n_{DMRS}^{OCC}$ of the $2^{nd}$ layer, $n_{DMRS}^{OCC}$ of the $3^{rd}$ layer, $n_{DMRS}^{OCC}$ of the $4^{th}$ layer$\}=\{n_{DMRS}^{OCC}, n_{DMRS}^{OCC}, 1-n_{DMRS}^{OCC}, 1-n_{DMRS}^{OCC}\}$ determination of the CS parameter value for each layer (if the calculated CS parameter value is one of 2, 4, 8, and 10) $\{n_{DMRS}^{(2)}$ of the $1^{st}$ layer, $n_{DMRS}^{(2)}$ of the $2^{nd}$ layer, $n_{DMRS}^{(2)}$ of the $3^{rd}$ layer, $n_{DMRS}^{(2)}$ of the $4^{th}$ layer$\}=\{n_{DMRS}^{(2)}, (n_{DMRS}^{(2)}+6) \bmod 12, (n_{DMRS}^{(2)}+3) \bmod 12, (n_{DMRS}^{(2)}+9) \bmod 12\}$ determination of the OCC for each layer (if the calculated CS parameter value is one of 2, 4, 8, and 10) $\{n_{DMRS}^{OCC}$ of the $1^{st}$ layer, $n_{DMRS}^{OCC}$ of the $2^{nd}$ layer, $n_{DMRS}^{OCC}$ of the $3^{rd}$ layer, $n_{DMRS}^{OCC}$ of the $4^{th}$ layer$\}=\{n_{DMRS}^{OCC}, n_{DMRS}^{OCC}, n_{DMRS}^{OCC}, n_{DMRS}^{OCC}\}$, wherein $n_{DMRS}^{(2)}$ indicates a CS parameter value of each layer, and $n_{DMRS}^{OCC}$ indicates an OCC index for each layer, which is defined by $n_{DMRS}^{OCC}=0 \rightarrow [+1, +1]$, $n_{DMRS}^{OCC}=1 \rightarrow [+1, -1]$.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
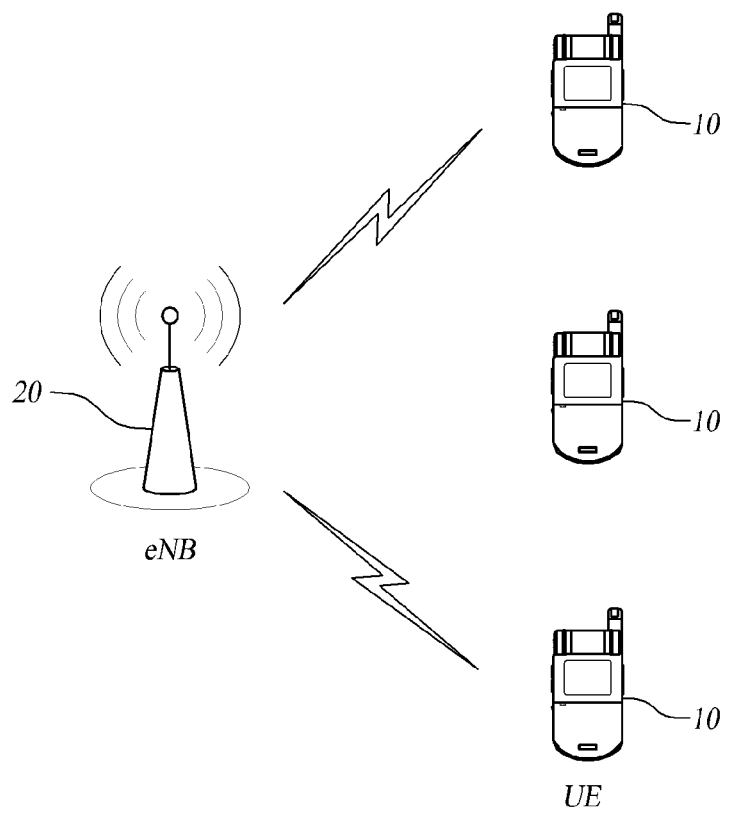
FIG. 1 is a block diagram illustrating a wireless communication system according to an exemplary embodiment.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. Various changes, modifications, and equivalents of the systems, apparatuses, and/or methods described herein will likely suggest themselves to those of ordinary skill in the art. Elements, features, and structures are denoted by the same reference numerals throughout the drawings and the detailed description, and the size and proportions of some elements may be exaggerated in the drawings for clarity and convenience.

The present disclosure is directed to a technology for transmitting and receiving a cyclic shift parameter which also implicitly indicate information relating to the orthogonality in a MIMO environment.

Also, the present disclosure is directed to a technology for transmitting and receiving a cyclic shift parameter, to allow the creation of a reference signal without a separate transmission of information relating to the orthogonality.

FIG. 1 is a block diagram illustrating a wireless communication system according to an exemplary embodiment.

Wireless communication systems are widely arranged in order to provide various communication services, such as voice, packet data, etc.

Referring to FIG. 1, a wireless communication system includes a UE (User Equipment) 10 and a BS (Base Station) 20. The UE 10 and the BS 20 may employ a technology of generating an extended reference signal for channel estimation.

The UE 10 may refer to a user terminal in a wireless communication, and may including a UE in WCDMA, LTE, HSPA (High Speed Packet Access), MS (Mobile Station), UT (User Terminal), SS (Subscriber Station), wireless device and an MS (Mobile Station) in GSM (Global System for Mobile Communication), and the like.

The UE 10 and the BS 20 are not limited to specifically expressed terms or words and may be two transmitting and receiving agents used for implementation of the technology or technical idea described herein. Further, in the following discussion, the terms "terminal", "user terminal", and "UE" are used as having the same meaning, and the terms "base station" and "eNodeB(evolved Node-B)" are used as having the same meaning.

Some examples of various multiple access schemes, include CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, and OFDM-CDMA, that can be applied to the wireless communication system.

For the uplink transmission and the downlink transmission, it is possible to use either a TDD (Time Division Duplex) scheme using different times for transmission or an FDD (Frequency Division Duplex) scheme using different frequencies for transmission.

Embodiments of the present invention can be applied to resource allocation in the asynchronous wireless communication, which may be a LTE (Long Term Evolution) and the LTE-A (LTE-advanced) through the GSM, the WCDMA, and the HSPA. Further, the embodiments may be applied to resource allocation in the synchronous wireless communication, which may be the CDMA, the CDMA-2000, and the UMB. The present invention shall not be restrictively construed based on a particular wireless communication field and shall be construed to include all technical fields to which the concept of the present invention can be applied.

The wireless communication system, to which embodiments of the present invention are applied, can support uplink and/or downlink HARQ, and may use a Channel Quality Indicator (CQI) for link adaptation. Further, different schemes may be used for the downlink transmission and uplink transmission. For example, an OFDMA (Orthogonal Frequency Division Multiple Access) scheme may be used for the downlink while an SC-FDMA (Single Carrier-Frequency Division Multiple Access) scheme is used for the uplink.

Radio interface protocol layers between a UE and a network may be classified into a first layer (L1), a second layer (L2), and a third layer (L3) based on the lower three layers of the Open System Interconnection (OSI) model widely known in the communication system, and a physical layer belonging to the first layer provides an information transfer service using a physical channel.

Figure 2:
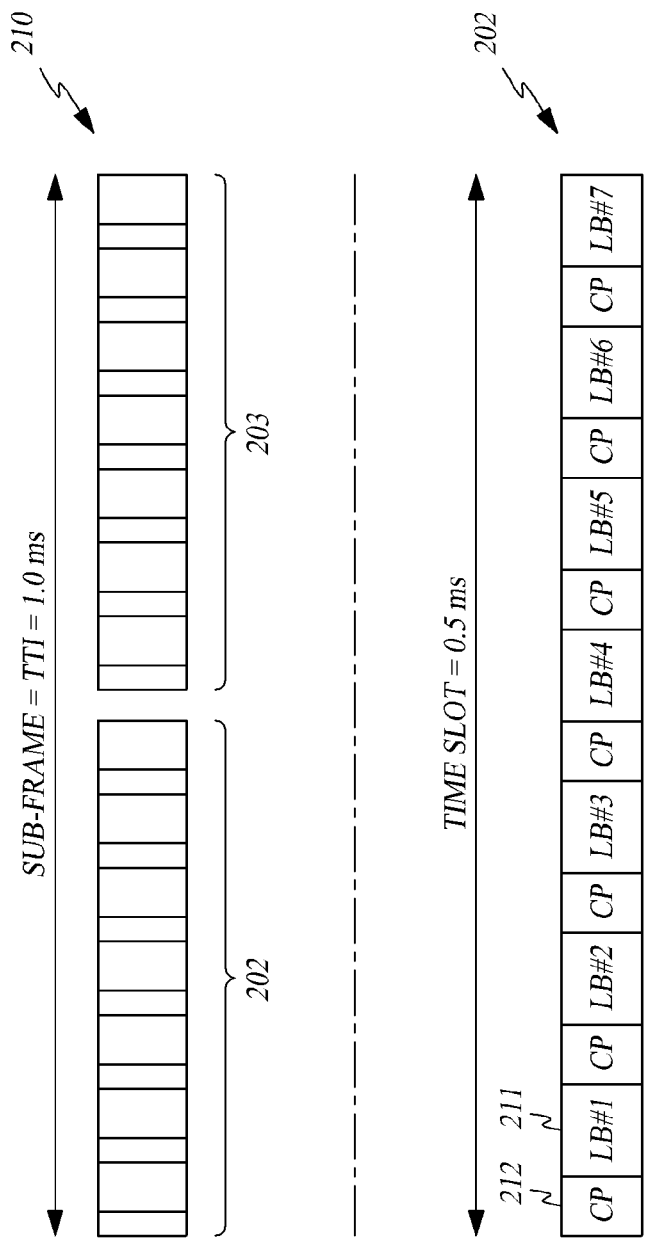
FIG. 2 illustrates structures of a sub-frame and a time slot according to an exemplary embodiment.

FIG. 2 illustrates structures of a sub-frame and a time slot according to an exemplary embodiment.

Referring to FIG. 2, one radio frame or wireless frame includes 10 sub-frames 210, and one sub-frame includes two slots 202 and 203. The basic unit of data transmission is the sub-frame, and downlink or uplink scheduling is performed for each sub-frame. One slot may include multiple OFDM (Orthogonal Frequency Division Multiplexing) symbols in the time domain and one or more sub-carriers in the frequency domain. Also, one slot may include 7 or 6 OFDM symbols.

For example, if a sub-frame includes two time slots, each time slot may include 7 or 6 symbols in the time domain and 12 sub-carriers in the frequency domain. A time-frequency area defined as including one slot along the time axis and 12 sub-carriers along the frequency axis may be called a Resource Block (RB), without limiting the present invention thereto.

In a $3^{rd}$ Generation Partnership Project (3GPP) LTE system, the transmission time of a frame is divided into Transmission Time Intervals (TTIs) each having duration of 1 ms. The terms "TTI" and "sub-frame" may have the same meaning, and one frame may a length of 10 ms and may include 10 TTIs.

Reference numeral 202 indicates a time slot having a structure according to an embodiment of the present invention. As described above, the TTI is a basic transmission unit, and one TTI includes two time slots 202 and 203 having the same length, with each time slot having duration of 0.5 ms. The time slot includes 7 or 6 Long Blocks (LBs) 211, each of which corresponds to a symbol. The LBs 211 are separated from each other by Cyclic Prefixes (CPs) 212. In summary, one TTI or sub-frame may include 14 or 12 LB symbols. However, the present disclosure is not limited to the frame, sub-frame, or time-slot structure as described above.

In the LTE communication system, which is one of the current wireless communication schemes, reference signals defined for the uplink include a Demodulation Reference Signal (DMRS or DM-RS) and a Sounding Reference Signal (SRS), reference signals defined for the downlink include a Cell-specific Reference Signal (CRS), a Multicast/Broadcast over Single Frequency Network (MBSFN) reference signal, and a UE-specific reference signal.

Specifically, in a wireless communication system, a UE transmits an uplink Demodulation Reference Signal (UL DMRS or UL DM-RS) in each slot in order to obtain channel information for demodulation of a data channel at the time uplink transmission. In the case of UL DM-RS related to a Physical Uplink Shared Channel (PUSCH), the reference signal is transmitted for one symbol in each slot. In the case of UL DM-RS related to a Physical Uplink Control Channel (PUCCH), the reference signal is transmitted for a maximum of three symbols in each slot. In this event, the mapped DM-RS sequence is configured in consideration of the Cyclic Shift (CS) and the base sequence $\bar{r}_{u,v}(n)$. In the case of LTE system, the DM-RS sequence may be configured for one layer.

Figure 3:
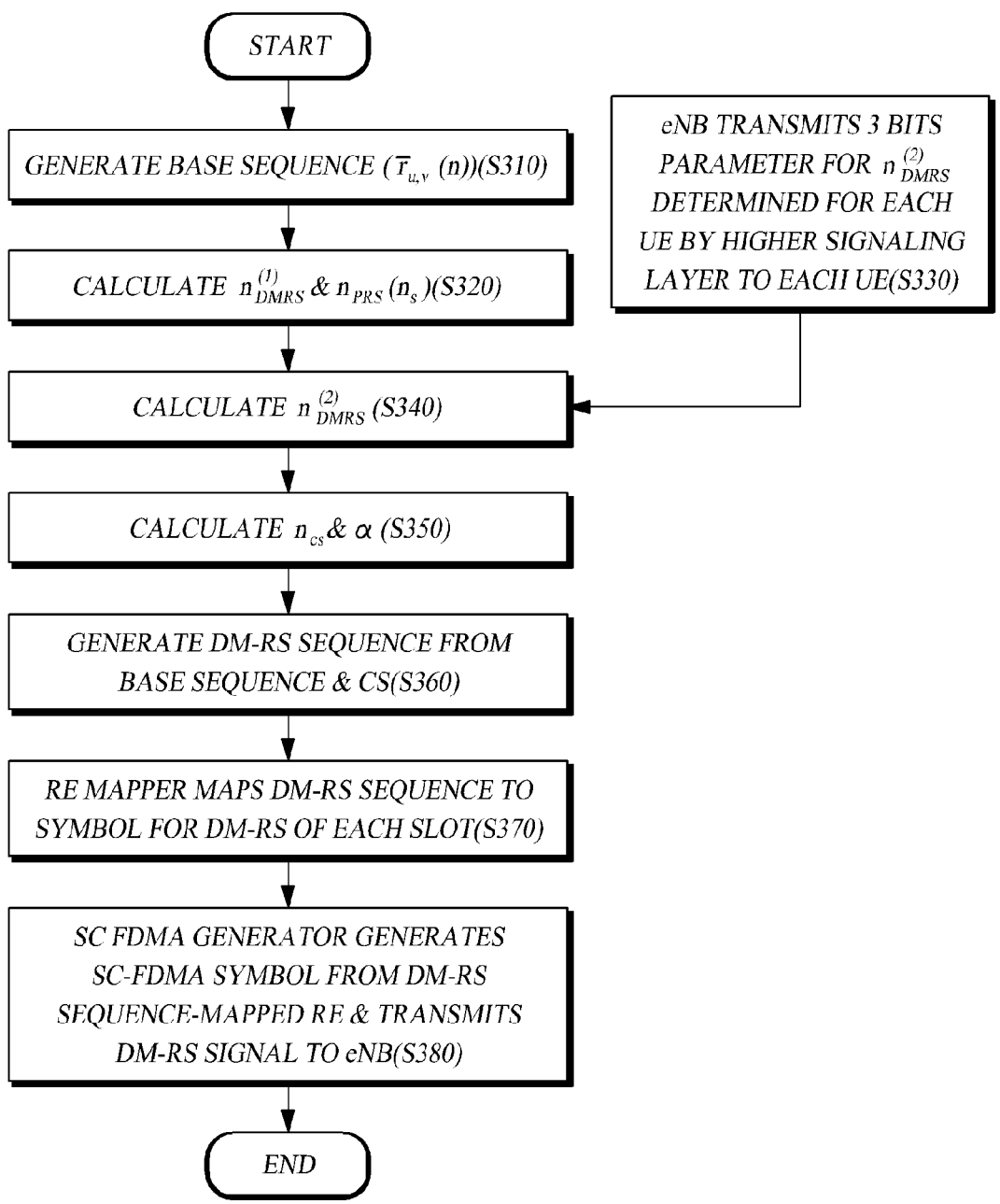
FIG. 3 is a flowchart illustrating a process of generating a DM-RS sequence by a UE in an LTE environment according to an exemplary embodiment.

FIG. 3 is a flowchart illustrating a process of generating a DM-RS sequence by a UE in an LTE environment according to an exemplary embodiment.

$$r_{u,v}^{(\alpha)}(n) = e^{j\alpha n} \bar{r}_{u,v}(n), \begin{cases} 0 \le n < M_{sc}^{RS} \\ M_{sc}^{RS} = mN_{sc}^{RB} \\ 1 \le m \le N_{RB}^{max,UL} \\ M_{sc}^{RS} \end{cases}$$ [Equation 1]

In Equation 1, $r_{u,v}^{(\alpha)}(n)$ indicates a Reference Signal (RS) sequence, $\alpha$ indicates a Cyclic Shift (CS), $\bar{r}_{u,v}(n)$ indicates a base sequence, and $M_{sc}^{RS}$ indicates the number of sub-carriers allocated for the UL DM-RS sequence along the frequency axis. Equation 1 shows an example in which a Reference Signal (RS) sequence is calculated by using a Cyclic Shift (CS) $\alpha$ and a base sequence $\bar{r}_{u,v}(n)$. First, for the UL DM-RS sequence, a base sequence, that may be based on a zadoff-chu sequence, is generated (step S310). The base sequence becomes different based on the group number u, the base sequence number v within the group, and the length n of the sequence. However, base sequences of UL DM-RSs occupying the same frequency bandwidth at the same slot time and in the same base station (or cell or eNodeB) may be the same.

In the meantime, the Cyclic Shift (CS) $\alpha$ can be obtained through a calculation defined by Equation 2 below.

$\alpha = 2\pi n_{cs}/12$ $n_{cs} = (n_{DMRS}^{(1)} + n_{DMRS}^{(2)} + n_{PRS}(n_s)) \bmod 12$ $n_{PRS}(n_s) = \sum_{i=0}^{7} c(8N_{symb}^{UL} \cdot n_s + i) \cdot 2^i$ [Equation 2]

In order to obtain $\alpha$, it is necessary to obtain the value of $n_{DMRS}^{(1)}$, $n_{DMRS}^{(2)}$, and $n_{PRS}(n_s)$ for $n_{cs}$.

$n_{DMRS}^{(1)}$ has a value determined by the value of cyclic shift parameter given by a higher layer for $n_{DMRS}^{(1)}$ as shown in Table 1 below. Therefore, $n_{DMRS}^{(1)}$ calculated as shown in Table 1 below (step S320).

TABLE 1

| | $n_{DMRS}^{(1)}$ |
|---|---|
| cyclicShift | $n_{DMRS}^{(1)}$ |
| 0 | 0 |
| 1 | 2 |

TABLE 1-continued

| | $n_{DMRS}^{(1)}$ |
|---|---|
| cyclicShift | $n_{DMRS}^{(1)}$ |
| 2 | 3 |
| 3 | 4 |
| 4 | 6 |
| 5 | 8 |
| 6 | 9 |
| 7 | 10 |

$n_{PRS}(n_s)$ can be obtained through a calculation defined by Equation 2 (step S320), and a pseudo random sequence c(i) may have a cell-specific value.

$n_{DMRS}^{(2)}$ is calculated by the cyclic shift in the DMRS field in the most recent DCI format 0 as shown in Table 2 below. Thus, $n_{DMRS}^{(2)}$ is determined by the value of the cyclic shift parameter given by a higher layer for $n_{DMRS}^{(2)}$. In step S330, the UE receives a 3 bits cyclic shift parameter for value of $n_{DMRS}^{(2)}$, which has been scheduled and determined by a higher signaling layer, for example, RRC (Radio Resource Control) signaling, from an eNodeB, in which a 3 bits cyclic shift parameter may be carried by the Cyclic Shift (CS) field of the DCI format 0 as shown in Table 2 below. The transmitted 3 bits cyclic shift parameter in CS field may be mapped for cyclic shift parameter value $n_{DMRS}^{(2)}$ as shown in Table 2 below, so that $n_{DMRS}^{(2)}$ can be calculated (steps S330 and S340).

TABLE 2

| | $n_{DMRS}^{(2)}$ |
|---|---|
| CS in DCI format 0 | $n_{DMRS}^{(2)}$ |
| 000 | 0 |
| 001 | 6 |
| 010 | 3 |
| 011 | 4 |
| 100 | 2 |
| 101 | 8 |
| 110 | 10 |
| 111 | 9 |

Then, $n_{cs}$ and $\alpha$ are calculated based on the values obtained in step S320 to S340 (step S350). The parameters $n_{DMRS}^{(1)}$ and $n_{PRS}(n_s)$ in $n_{cs}$ for calculating $\alpha$ vary according to the eNodeB (or cell) and the slot time. However, they are fixed values in the same eNodeB (or cell) and the same slot time. Therefore, $n_{cs}$ may actually depends on the parameter value of $n_{DMRS}^{(2)}$. That is, the $n_{DMRS}^{(2)}$ is the parameter value actually scheduled and transmitted to each UE by a higher signaling layer through an eNodeB, and $\alpha$, which is the CS value of the UL DM-RS, depends on $n_{DMRS}^{(2)}$.

Further, by Equation 1 using the base sequence of step S310 and the $\alpha$ (CS value) of step S350, the DM-RS sequence is generated (step S360).

The DM-RS sequence generated by Equation 1 is mapped to a corresponding symbol of each slot by a Resource Element (RE) mapper (step S370). In the case of DM-RS relating to the PUSCH, the symbol corresponds to the fourth symbol among the seven symbols of each slot if a normal CP is used and corresponds to the third symbol among the seven symbols of each slot if an extended CP is used. In the case of DM-RS relating to the PUCCH, the corresponding symbol may include a maximum of three symbols in each slot, the number and locations of corresponding symbols depend on the type of CP and the format of PUCCH as shown in Table 3 below.

TABLE 3

Symbol locations in slot depending on CP type and PUCCH format

| PUCCH format | Symbol locations in slot | |
| --- | --- | --- |
| | Normal CP | Extended CP |
| 1, 1a, 1b | 2, 3, 4 | 2, 3 |
| 2 | 1, 5 | 3 |
| 2a, 2b | 1, 5 | N/A |

If the mapping has been completed, an SC FDMA generator generates an SC-FDMA symbol from an RE, to which the DM-RS sequence has been mapped, and then transmits the generated DM-RS signal to the eNodeB (S380).

The LTE-Advanced (LTE-A) system has a maximum of four antennas that are supported for the uplink, which requires discriminative DM-RS sequence mapping for a maximum of four layers. To this end, the base sequence may have different CS values, to thereby maintain the orthogonality.

Further, there is a method of adding an OCC (Orthogonal Cover Code) for each slot, which has been proposed in order to further guarantee the orthogonality between layers in SU-MIMO (Single-User Multiple Input Multiple Output) and MU-MIMO (Multiple-User Multiple Input Multiple Output), or in order to discriminate multiple UEs in MU-MIMO.

The OCC may be configured as shown in Table 4 below.

TABLE 4

Configuration of OCC

| $n_{OCC}$ | OCC |
| --- | --- |
| 0 | {+1, +1} |
| 1 | {+1, −1} |

In the case of the conventional LTE using only one layer, a CS value scheduled and determined by a higher signaling layer is signaled to the UE as a value of 3 bits. However, the LTE-A system should provide a CS value and OCC so that many layers and the UE can have the orthogonality to each other. For example, in the case of using a maximum of four layers, it is necessary to apply the CS and OCC to the maximum of four layers, so as to guarantee the orthogonality.

Therefore, the eNodeB transfers information on $n_{occ}$ of 1 bit, which indicates the OCC, to the UE, so as to guarantee the orthogonality between UEs or layers in the mapping of the DM-RS sequence by using this information. Thus, in order to transfer $n_{occ}$ to the UE, the eNodeB may transmit $n_{occ}$ by itself to the UE through direct 1 bit signaling. However, in the case of LTE-A differently from the LTE, the addition of 1 bit signaling would require the addition of 1 bit to each Component Carrier (CC) in each sub-frame for transmission, which may cause additional overhead. Moreover, differently from the 3 bits signaling using the DCI format 0 in the conventional LTE, the LTE-A would require 4 bits including the additional 1 bit, which requires configuration of another DCI format different from that of the LTE. Therefore, it is necessary to enable the UE to use an OCC without separate 1 bit signaling.

In the LTE system, it is may not be necessary to simultaneously take the SU-MIMO and MU-MIMO environments into consideration. However, in the LTE-A system, it may be necessary to simultaneously satisfy optimized CS value and OCC allocation in order to discriminate multiple UEs in the MU-MIMO and each layer in the SU-MIMO. Especially, it may be necessary for the UE to generate a reference signal by allocating the OCC and the CS without the additional signaling as described above.

The present disclosure presents a method and an apparatus for allocating an OCC and a CS value in each layer of an UL DM-RS. Further, the present disclosure provides a method and an apparatus, which allows the allocation of different CS values and different OCCs according to whether the access state of the UE is the SU-MIMO or the MU-MIMO, so that the OCC can be used to discriminate each layer in the SU-MIMO and to discriminate between multiple UEs in the MU-MIMO. Especially, if a CS value of the first layer determined at a higher signaling layer is given to a UE through an eNodeB, the UE can recognize CS values of other layers and the OCC of each layer from the given value without any additional signaling.

Figure 4:
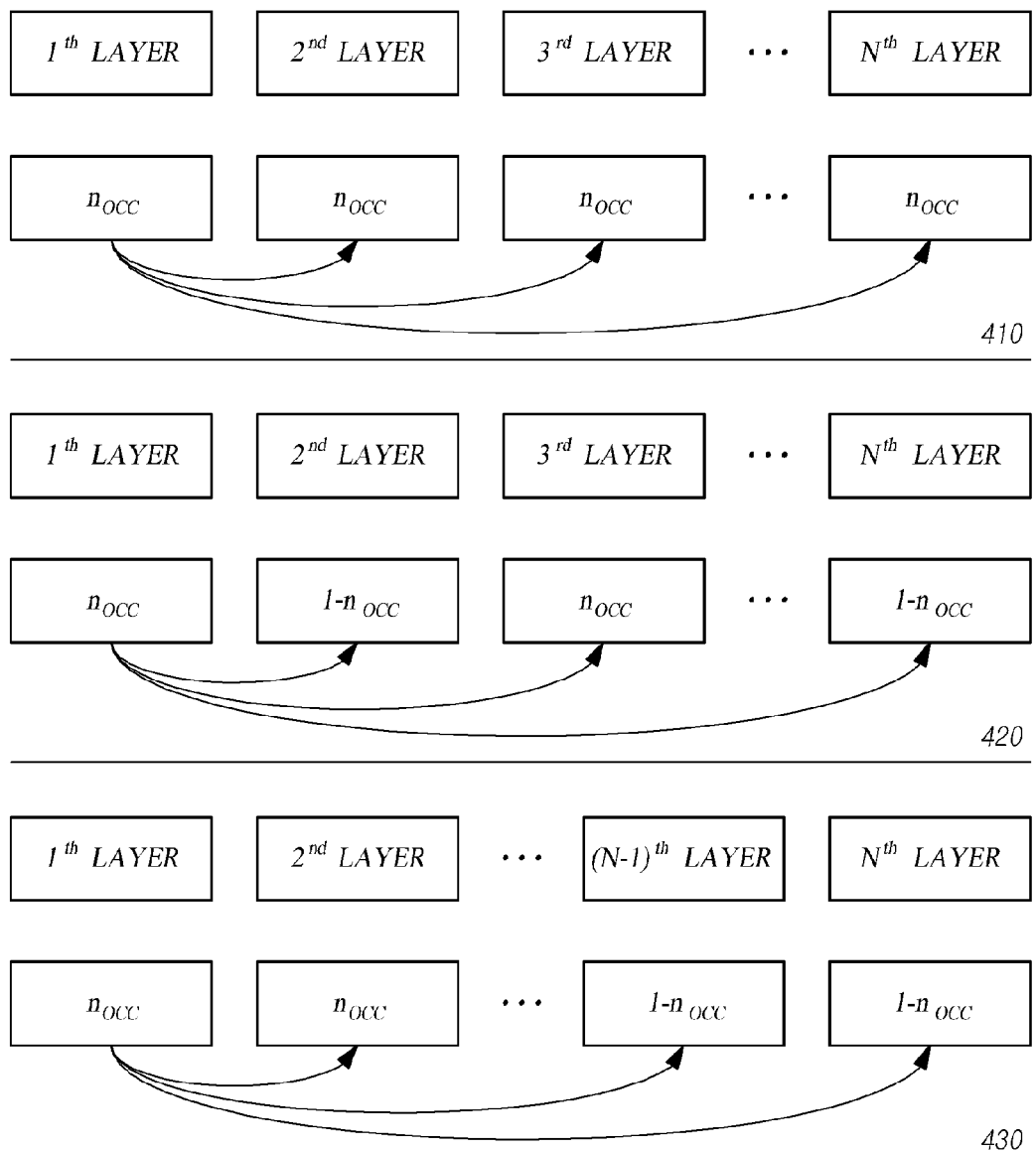
FIG. 4 illustrates an orthogonality allocation rule according to an exemplary embodiment.

FIG. 4 illustrates an orthogonality allocation rule according to an exemplary embodiment.

The orthogonality allocation rule refers to a rule applied in allocating information relating to the orthogonality of each layer. The information relating to the orthogonality may be information to indicate the orthogonal sequence used for generation reference signal. As described above with reference to Table 4, $n_{occ}$, which indicates the OCC or the configuration of the OCC, may be an example of the information relating to the orthogonality.

The rule shown in FIG. 4 corresponds to a rule relating to the scheme in which the information relating to the orthogonality is set for each layer. In FIG. 4, $n_{occ}$, i.e. OCC index, is employed as an example, wherein the OCC index may have two values (0 or 1).

The orthogonality allocation rule includes a uniform scheme and a non-uniform scheme. The uniform scheme refers to a scheme in which orthogonality-related information for a particular layer is identically allocated to the other layers. The uniform scheme may be employed in order to provide the orthogonality to each UE, for example, it may be employed in the case of the MU-MIMO. The case 410 corresponds to an example of the uniform scheme, wherein the OCC index $n_{occ}$ of the first layer is allocated without a change to the N layers.

The non-uniform scheme refers to a scheme in which the same information as the orthogonality-related information for a particular layer is allocated to some layers while information different from the orthogonality-related information for a particular layer is allocated to the other layers. The non-uniform scheme may be employed in order to provide the orthogonality to each UE, for example, it may be employed in the case of the SU-MIMO.

The non-uniform scheme may include an alternating scheme and a division scheme. The case 420 corresponds to an example of the alternating scheme, wherein the OCC index $n_{occ}$ is allocated to the layers in every other turn among the sequentially arranged 1st, 2nd, ..., Nth layers, that is, the OCC index $n_{occ}$ and another index (such as 1−$n_{occ}$) are alternately allocated to the 1st, 2nd, ..., Nth layers. The case 430 corresponds to an example of the division scheme, wherein the 1st, 2nd, ..., Nth layers are divided into two groups, and the OCC index nocc is allocated to one group while another OCC index (1−nocc) is allocated to the other group. By using the orthogonality allocation rule as described above, it is possible to allocate different CS values and different OCCs according to whether the access state of the UE is the SU-MIMO or the MU-MIMO.

A separate signaling of information indicating the orthogonality allocation rule may increase the quantity of transmitted/received data. Therefore, it may be necessary to implement an implicit scheme so that the UE can select the orthogonality allocation rule without a separate signaling. Now, a method of providing orthogonality-related information without a separate signaling and a method of implicitly providing an orthogonality allocation rule will be discussed.

First, a process of providing orthogonality-related information to a UE without a separate signaling by an eNodeB will be discussed. During this process, the UE may implicitly receive orthogonality-related information and/or an orthogonality allocation rule.

Figure 5:
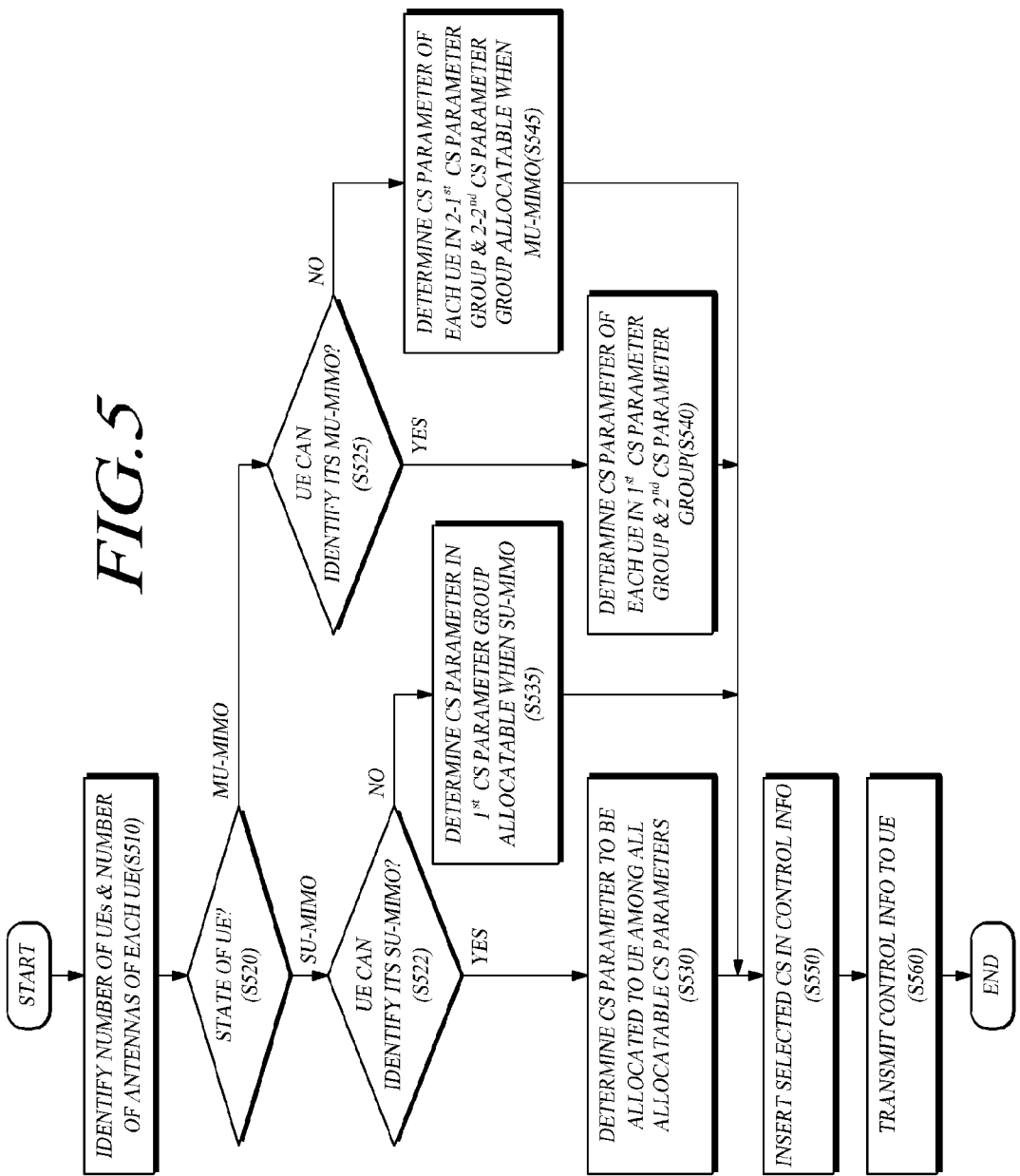
FIG. 5 is a flowchart illustrating a process of setting and transmitting control information to a UE by an eNodeB according to an exemplary embodiment.

FIG. 5 is a flowchart illustrating a process of setting and transmitting control information to a UE by an eNodeB according to an exemplary embodiment.

FIG. 5 shows a process in which an eNodeB determines and transmits a cyclic shift parameter to a UE so that the UE can infer an OCC, that is, the UE can estimate information relating to the orthogonality.

During the process, the eNodeB determines the multiple access state of one or more UEs, determines a cyclic shift parameter for obtaining information relating to the orthogonality based on the determined multiple access state, and transmits the determined cyclic shift parameter to the UE. This process will be described now in more detail.

The eNodeB identifies the number of UEs or the number of antennas (or layers) of each UE (step S510). This identification is followed by a determination of whether the UE corresponds to the SU-MIMO or the MU-MIMO (step S520). As a result of the determination (step S520), if the multiple access state of the UE is the SU-MIMO, the eNodeB determines whether the UE can identify that the UE is in the SU-MIMO state (step S522). The UE can either directly identify by itself that the UE is in the SU-MIMO state or indirectly infer that the UE is in the SU-MIMO state, from the state information of the network, such as sequence hopping of a reference signal.

If the UE can identify that the UE is in the SU-MIMO state, the eNodeB performs step S530. The case in which the UE can identify that the UE is in the SU-MIMO state includes a state in which the UE can identify the orthogonality allocation rule through the state of the network, and corresponds to a case in which the UE can determine, either directly by itself or through inference from another piece of information, whether the current access state of the UE is an SU-MIMO state or an MU-MIMO state. In step S530, the eNodeB determines a cyclic shift parameter to be allocated to the UE among all allocable cyclic shift parameters, an example of which may be $n_{DMRS}^{(2)}$.

If the UE cannot identify that the UE is in the SU-MIMO state, the eNodeB performs step S535. In step S535, the eNodeB determines a cyclic shift parameter to be allocated from a first cyclic shift parameter group including cyclic shift parameters that can be allocated in the case of the SU-MIMO, so that the UE can identify that the UE is in the SU-MIMO state.

If the multiple access state of the UE is the MU-MIMO, the eNodeB determines whether the UE can identify that the UE is in the MU-MIMO state (step S525). The UE can either directly identify by itself that the UE is in the MU-MIMO state or indirectly infer that the UE is in the MU-MIMO state, from the state information of the network, such as sequence hopping of a reference signal.

If the UE can identify that the UE is in the MU-MIMO state, the eNodeB performs step S540. The case in which the UE can identify that the UE is in the MU-MIMO state includes a state in which the UE can identify the orthogonality allocation rule through the state of the network, and corresponds to a case in which the UE can determine, either directly by itself or through inference from another piece of information, whether the current access state of the UE is an SU-MIMO state or an MU-MIMO state. In step S540, for the orthogonality allocation rule, the UE can set orthogonality-related information by identifying the information relating to the access state.

In more detail, all cyclic shift parameters allocable to the UE can be grouped into a first set and a second set, wherein an intersection between the first set and the second set is an empty set. In other words, a cyclic shift parameter belonging to the first set shall not belong to the second set. Further, in order to set values of cyclic shift parameters, the first set may relate to and provide first information relating to the orthogonality and the second set may relate to and provide second information relating to the orthogonality.

The case in which the number of sets is at least 2 according to an embodiment of the present invention can be applied to the case where there are two pieces of information relating to the orthogonality. If there are N pieces of information relating to the orthogonality, the cyclic shift parameters may be grouped into N sets while each of the intersections of the N sets is an empty set. Further, according to another embodiment of the present invention, the cyclic shift parameters may be divided by using functions, etc. instead of using sets. Thus, it is possible to use a function of mapping a predetermined cyclic shift parameter to first information relating to the orthogonality while mapping another cyclic shift parameter to second information relating to the orthogonality.

The eNodeB inserts a selected cyclic shift into control information (step S550). According to an embodiment of the present invention, the eNodeB may insert the cyclic shift into Downlink Control Information (DCI) format 0 which may be related for uplink signaling in the Physical Downlink Control Channel (PDCCH).

Further, the eNodeB transmits the control information to the UE (step S560). By receiving the control information, the UE can identify the orthogonality-related information in the set including the cyclic shift. Further, if the UE has determined, either directly by itself or through inference from another piece of information, whether the current access state of the UE is an SU-MIMO state or an MU-MIMO state, the UE can select an orthogonality allocation rule and set an OCC for each layer according to the selected orthogonality allocation rule. In the previously received cyclic shift, a cyclic shift parameter may be set for each layer.

In more detail, with respect to multiple UEs, a cyclic shift parameter for each UE is determined in the first cyclic shift parameter group or the second cyclic shift parameter group. Although all of the multiple UEs may receive a cyclic shift parameter determined in only one group among the first and second cyclic shift parameter groups, two UEs having different allocated bandwidths (or non-equal bandwidth resource allocation) receive cyclic shift parameters determined in different cyclic shift parameter groups. At this time, the first information relating to the orthogonality obtained from the first cyclic shift parameter group is determined to be different from the second information relating to the orthogonality obtained from the second cyclic shift parameter group. Thus, since it is possible to obtain the information relating to the orthogonality from the cyclic shift parameter, the first cyclic shift parameter group and the second cyclic shift parameter group should be determined in such a manner that different information (e.g. different OCCs) relating to the orthogonality can be obtained from the first cyclic shift parameter group and the second cyclic shift parameter group. Further, it may be possible to determine the orthogonality allocation rule from the first cyclic shift parameter group and the second cyclic shift parameter group.

Next, if the UE cannot identify that the UE is in the MU-MIMO state, the eNodeB performs step S545. The case in which the UE cannot identify that the UE is in the MU-MIMO state includes a case in which the UE cannot identify the state of the network. Since the UE cannot identify that the current access state of the UE is the SU-MIMO state or the MU-MIMO state, the UE can identify the orthogonality allocation rule through the cyclic shift parameter. Of course, it is also possible to set the orthogonality-related information by using the cyclic shift parameter.

In more detail, all cyclic shift parameters allocable to the UE can be grouped into a first set and a second set, wherein an intersection between the first set and the second set is an empty set. That is, a cyclic shift parameter belonging to the first set shall not belong to the second set. Further, in order to set values of cyclic shift parameters, the first set may relate to and provide first information relating to the orthogonality and the second set may relate to and provide second information relating to the orthogonality. Further, the second set is divided into a $2\text{-}1^{st}$ set and a $2\text{-}2^{nd}$ set, an intersection of which is an empty set. In step S545, in the case of MU-MIMO, the cyclic shift parameter is included in the $2\text{-}1^{st}$ set or the $2\text{-}2^{nd}$ set for each UE. As a result, if a cyclic shift parameter extracted from the information received by the UE is included in the $2\text{-}1^{st}$ set or the $2\text{-}2^{nd}$ set, the UE can extract the orthogonality-related information from the information relating to the set and can infer an orthogonality-related rule for another layer from the $2\text{-}1^{st}$ set and the $2\text{-}2^{nd}$ set. For example, upon receiving the cyclic shift parameter included in the $2\text{-}1^{st}$ set and the $2\text{-}2^{nd}$ set, the UE can obtain the orthogonality allocation rule for each layer proper for the MU-MIMO in the same manner.

The case in which the number of sets (the $2\text{-}1^{st}$ set and the $2\text{-}2^{nd}$ set) is 2 according to an embodiment of the present invention can be applied to the case where there are two pieces of information relating to the orthogonality. If there are N pieces of information relating to the orthogonality, the cyclic shift parameters may be grouped into N sets while each of intersections of the N sets is an empty set. Further, the cyclic shift parameters may be divided by using functions, etc. instead of using sets. Thus, it is possible to use a function of mapping a predetermined cyclic shift parameter to first information relating to the orthogonality while mapping another cyclic shift parameter to second information relating to the orthogonality.

Two or more sets may be the sets as described below. However, the present disclosure is not limited to the sets described below and is characterized by a configuration capable of transmitting orthogonality-related information without separately transmitting the orthogonality allocation rule.

In step S540, the first UE group and the second UE group correspond to an example of two or more UEs having different allocated bandwidths (or non-equal bandwidth resource allocation) in the MU-MIMO environment. In other words, for the groups according to the two different allocated bandwidths in the MU-MIMO environment, which include the first UE group and the second UE group having the two different allocated bandwidths, the eNodeB determines cyclic shift parameters of the first cyclic shift parameter group to be received by one or more UEs in the first UE group and cyclic shift parameters of the second cyclic shift parameter group to be received by one or more UEs in the second UE group. In this event, the determining is made in such a manner to make the first information relating to the orthogonality obtained from the first cyclic shift parameter group be different from the second information relating to the orthogonality obtained from the second cyclic shift parameter group.

In step S545, the $2\text{-}1^{st}$ UE group and the $2\text{-}2^{nd}$ UE group correspond to an example of two or more UEs having different allocated bandwidths (or non-equal bandwidth resource allocation) in the MU-MIMO environment. In other words, for the groups according to the two different allocated bandwidths in the MU-MIMO environment, which include the $2\text{-}1^{st}$ UE group and the $2\text{-}2^{nd}$ UE group having the two different allocated bandwidths, the eNodeB determines cyclic shift parameters of the $2\text{-}1^{st}$ cyclic shift parameter group to be received by one or more UEs in the $2\text{-}1^{st}$ UE group and cyclic shift parameters of the $2\text{-}2^{nd}$ cyclic shift parameter group to be received by one or more UEs in the $2\text{-}2^{nd}$ UE group. In this event, the determining is made in such a manner to make the first information relating to the orthogonality obtained from the $2\text{-}1^{st}$ cyclic shift parameter group be different from the second information relating to the orthogonality obtained from the $2\text{-}2^{nd}$ cyclic shift parameter group.

Especially, the two UEs having different allocated bandwidths (non-equal bandwidth resource allocation) may be scheduled to necessarily receive CS parameters for $n_{DMRS}^{(2)}$ of different CS-OCC linkage groups (in the MU-MIMO environment, two UEs having the same allocated bandwidths (equal bandwidth resource allocation) need not be scheduled to necessarily receive CS parameters for $n_{DMRS}^{(2)}$ of different CS-OCC linkage groups).

As described above with reference to FIG. 5, the eNodeB generates CS parameter for $n_{DMRS}^{(2)}$, which enable inference of an OCC value without separate setting of the OCC value. That is, the UE may calculate a corresponding OCC value from the CS parameter for $n_{DMRS}^{(2)}$ received through the DCI format, etc. and applies the calculated OCC value to generation of the DM-RS. There may be various processes of calculating the OCC value from the CS parameter for $n_{DMRS}^{(2)}$. As noted from Table 4, if the OCC index has a value of 0 or 1, the value of the CS parameter for $n_{DMRS}^{(2)}$ may be divided by 2 and a remainder of the division may be taken as the OCC index value. Further, as another example, it is possible to take a scheme of previously linking the CS parameter for $n_{DMRS}^{(2)}$ and the OCC to each other into consideration.

The eight types of CS parameters for $n_{DMRS}^{(2)}$ values from the 3 bits CS field of the DCI format 0 in the LTE system as shown in Table 2 may be divided into two CS-OCC linkage groups each including four $n_{DMRS}^{(2)}$ values as shown in Table 5. The CS parameter values $n_{DMRS}^{(2)}$ in one group are identically linked to one OCC index $n_{DMRS}^{OCC}$, while CS parameter values $n_{DMRS}^{(2)}$ in the other group are linked to the other OCC index $n_{DMRS}^{OCC}$. Such linkage is shown in Table 5. However, the method of dividing the CS parameter values $n_{DMRS}^{(2)}$ into two groups is not limited to the configuration and allocation as shown in Table 5. Instead, the CS parameter values $n_{DMRS}^{(2)}$ may be grouped to guarantee the maximum orthogonality through the OCC and a uniform distribution of the DM-RS. For example, in consideration of four CS parameter values {0, 3, 6, 9}, which are applicable in four layers of rank 4, they may be grouped in a uniform and crossed manner so that the OCC index for {0, 6} has a value of 0 while the OCC index for {3, 9} has a value of 1.

In Table 5, if the $n_{DMRS}^{(2)}$ is 0, 6, 4, or 10, the OCC index is 0 and the UE thus allocates [+1, +1] for the OCC value. And if the $n_{DMRS}^{(2)}$ is 3, 9, 2, or 8, the OCC index is 1 and the UE thus allocates [+1, −1] for the OCC value.

TABLE 5

CS-OCC linkage rule

| CS parameter | CS parameter $n_{DMRS}^{(2)}$ | OCC index $n_{DMRS}^{OCC}$ |
|---|---|---|
| CS-OCC linkage group A | $n_{DMRS}^{(2)}$: {0, 6, 4, 10} | $n_{DMRS}^{OCC} = 0\ (\rightarrow [+1, +1])$ |
| CS-OCC linkage group B | $n_{DMRS}^{(2)}$: {3, 9, 2, 8} | $n_{DMRS}^{OCC} = 1\ (\rightarrow [+1, -1])$ |

Table 5 presents an example of inference of an OCC from a CS by using a group. Besides, the eNodeB and the UE may share information (e.g. $n_{DMRS}^{(2)}$ modulus (mod) 2) of a function having the CS value as an input value. Of course, Table 5 may be implemented as a function.

In the case of applying the configuration shown in Table 5, if a Cyclic Shift (CS) value for the first layer scheduled and determined by a higher signaling layer is given (i.e. signaled) to the UE through an eNodeB, it is possible to allocate an OCC of each layer according to a predetermined orthogonality allocation rule and a CS value of another layer based on the given or signaled value.

First, a case in which the orthogonality allocation rule is a non-uniform scheme is discussed hereinafter.

The eNodeB generates a control signal, which includes DCI format 0 including a 3 bits CS parameter for value of $n_{DMRS}^{(2)}$ determined for each UE by a higher signaling layer of the system. A higher signaling layer determines whether each UE to be scheduled will operate in an SU-MIMO or an MU-MIMO. If the UE operates in an SU-MIMO state, the eNodeB transmits a 3 bits CS parameter which indicate CS parameter value ($n_{DMRS}^{(2)}$) regardless of the CS-OCC linkage group of Table 5. Thus, in the case of the SU-MIMO, the 3 bits CS parameter for value of $n_{DMRS}^{(2)}$ determined for each UE by a higher signaling layer of the system is one of the eight types of values including the CS-OCC linkage group A and the CS-OCC linkage group B as shown in Table 5, and the eNodeB transmits the 3 bits CS parameter for value of $n_{DMRS}^{(2)}$ to each UE.

The eNodeB transmits the generated control information. Specifically, this 3 bits parameter may be carried by the CS field of the DCI format 0.

If the corresponding UEs operate in the MU-MIMO state, the eNodeB considers the CS-OCC linkage groups shown in Table 5 in transmitting the 3 bits CS parameter for value of $n_{DMRS}^{(2)}$. Thus, in the case of the MU-MIMO, in scheduling by a higher signaling layer of the system in order to determine the CS parameter which indicate CS parameter value ($n_{DMRS}^{(2)}$) for each UE, UEs may be scheduled to select different CS parameter which indicate CS parameter values ($n_{DMRS}^{(2)}$) of different CS-OCC linkage groups. Especially, two UEs having different allocated bandwidths (non-equal bandwidth resource allocation) should be scheduled to necessarily receive CS parameters for $n_{DMRS}^{(2)}$ of different CS-OCC linkage groups (in the MU-MIMO environment. However, in the MU-MIMO environment, two UEs having the same allocated bandwidths (or equal bandwidth resource allocation) need not be scheduled to receive CS parameters for $n_{DMRS}^{(2)}$ of different CS-OCC linkage groups). That is, if one UE has been scheduled to receive one of the four CS parameters for value of $n_{DMRS}^{(2)}$ of the CS-OCC linkage group A, the other UE is scheduled to receive one of the four CS parameters for $n_{DMRS}^{(2)}$ of the CS-OCC linkage group B. For example, if UE #1 has received 0, which is one of the four CS parameter values $n_{DMRS}^{(2)}$ of the CS-OCC linkage group A, for a particular layer, UE #2 receives 3, which is one of the four CS parameter values $n_{DMRS}^{(2)}$ of the CS-OCC linkage group B, for the same layer. In this event, the two UEs in the MU-MIMO environment inevitably have different OCC indexes, so that they can be discriminated from each other.

Next, the UE receives the 3 bits CS parameter for value of $n_{DMRS}^{(2)}$ scheduled and determined by a higher signaling layer of the system through the eNodeB. This 3 bits parameter may be carried by the CS field of the DCI format 0. As described above, this 3 bits CS parameter for value of $n_{DMRS}^{(2)}$ is scheduled and determined by a higher signaling layer of the system according to whether the state of the corresponding system is the SU-MIMO or the MU-MIMO. The UE can know the $n_{DMRS}^{(2)}$ from this 3 bits parameter as in Table 2 described above, and calculates the CS value α of the UL DM-RS by Equation 1 described above. In this event, although other parameters $n_{DMRS}^{(1)}$ and $n_{PRS}(n_s)$ configuring $n_{cs}$ are different according to the eNodeB (or cell) and the slot time, they are fixed for the same eNodeB (or cell) and slot time. Therefore, the parameter actually scheduled and transmitted through the eNodeB by the higher signaling layer for a UE is $n_{DMRS}^{(2)}$. As a result, the CS values α of the UL DM-RS become different.

Thus, the UE calculates the CS values α from the CS parameter for value of $n_{DMRS}^{(2)}$ in the DCI format 0 scheduled and determined by a higher signaling layer of the system and transmitted through the eNodeB. Further, the UE calculates the OCC index $n_{DMRS}^{OCC}$ of the first layer from the received CS parameter for value of $n_{DMRS}^{(2)}$ by a predefined CS-OCC linkage rule. An example of the predefined CS-OCC linkage rule is shown in Table 5 described above. For example, if the CS parameter value $n_{DMRS}^{(2)}$ is 0, 6, 4, or 10, which correspond to the CS-OCC linkage group A in Table 5, the $n_{DMRS}^{OCC}$ is automatically calculated as 0. In contrast, if the CS parameter value $n_{DMRS}^{(2)}$ is 3, 9, 2, or 8, which correspond to the CS-OCC linkage group B in Table 2, the $n_{DMRS}^{OCC}$ is automatically calculated as 1. If the $n_{DMRS}^{OCC}$ is 0, it may correspond to an OCC {+1, +1}. If the $n_{DMRS}^{OCC}$ is 1, it may correspond to an OCC {+1, -1}. The mathematical expression and values of the parameters expressing the OCC index are not limited as long as the meaning and contents thereof are not changed.

Next, the UE determines if there is any layer to be additionally allocated or used further beyond the first layer. If there is an additional layer, the UE calculates the CS values α of a corresponding layer from the CS parameter value $n_{DMRS}^{(2)}$ of the first layer, and calculates the OCC index $n_{DMRS}^{OCC}$ of the corresponding layer from the OCC index $n_{DMRS}^{OCC}$ of the first layer.

In this event, the CS allocation rule, by which the CS values α of a corresponding layer is calculated from the CS parameter value $n_{DMRS}^{(2)}$ of the first layer, is the most proper method capable of reducing inter-layer interference, if the total number of layers is taken into consideration and the CS values allocated to the layers have distances as large as possible.

Equation 3 below shows an example of the CS allocation rule.

$n_{DMRS}^{(2)}$: CS parameter of the 1$^{st}$ layer
In SU-MIMO, $n_{DMRS}^{(2)} \in \{0, 6, 3, 4, 2, 8, 10, 9\}$
In MU-MIMO, $n_{DMRS}^{(2)} \in \{0, 6, 4, 10\}$ or $n_{DMRS}^{(2)} \in \{3, 9, 2, 8\}$
1) In the case of Rank 2

$$\{n_{DMRS}^{(2)} \text{ of the 1}^{st} \text{ layer}, n_{DMRS}^{(2)} \text{ of the 2}^{nd} \text{ layer}\} = \{n_{DMRS}^{(2)}, (n_{DMRS}^{(2)}+6) \bmod 12\}$$

2) In the case of Rank 3

$$\{n_{DMRS}^{(2)} \text{ of the 1}^{st} \text{ layer}, n_{DMRS}^{(2)} \text{ of the 2}^{nd} \text{ layer}, n_{DMRS}^{(2)} \text{ of the 3}^{rd} \text{ layer}\} = \{n_{DMRS}^{(2)}, (n_{DMRS}^{(2)}+4) \bmod 12, (n_{DMRS}^{(2)}+8) \bmod 12\}$$

3) In the case of Rank 4

$$\{n_{DMRS}^{(2)} \text{ of the 1}^{st} \text{ layer}, n_{DMRS}^{(2)} \text{ of the 2}^{nd} \text{ layer},$$
$$n_{DMRS}^{(2)} \text{ of the 3}^{rd} \text{ layer}, n_{DMRS}^{(2)} \text{ of the 4}^{th}$$
$$\text{layer}\} = \{n_{DMRS}^{(2)}, (n_{DMRS}^{(2)}+6) \bmod 12,$$
$$(n_{DMRS}^{(2)}+3) \bmod 12, (n_{DMRS}^{(2)}+9) \bmod 12\} \text{ or }$$
$$\{n_{DMRS}^{(2)}, (n_{DMRS}^{(2)}+3) \bmod 12, (n_{DMRS}^{(2)}+6) \bmod$$
$$12, (n_{DMRS}^{(2)}+9) \bmod 12\} \qquad \text{[Equation 3]}$$

In Equation 3, the 1$^{st}$ layer refers to the first layer, and the 2$^{nd}$ 3$^{rd}$ . . . layers refer to the second, third, . . . layers. Further, rank refers to the number of layers.

In the case of rank 2 in Equation 3, the CS values of the first and second layers are set to have an interval of 6 (180 degrees) between them so that they can be spaced as much as possible within 360 degrees. In the case of rank 3, the CS values are set to have an interval of 4 (120 degrees) between them so that they can be spaced as much as possible within 360 degrees. Further, in the case of rank 4, the CS values are set to have an interval of 3 (90 degrees) between them so that they can be spaced as much as possible within 360 degrees.

Therefore, once the CS value of the first layer has been set, the CS values of the other layers are set to have a largest distance according to the rank number based on the first layer.

After the CS values of the layers are calculated, the UE calculates OCC indexes of the 2$^{nd}$ to N$^{th}$ layers based on the OCC of the first layer or the CS parameter for $n_{DMRS}^{(2)}$. As described above, the UE calculates the OCC of the first layer through the $n_{DMRS}^{(2)}$ according to the scheme as shown in Table 5. Further, the OCC also may be allocated to have orthogonality. The OCCs of the second, third, . . . layers may be calculated from the OCC (i.e. value obtained from the CS parameter for $n_{DMRS}^{(2)}$) of the first layer. To this end, in consideration of the number of all layers, if the OCC values allocated to the layers are related to preset CS values, the CS allocation rule secures an orthogonality as large as possible, so as to reduce the inter-layer interference as much as possible. In Equation 4 defined below, the $n_{DMRS}^{OCC}$ may be set to have different values for the first, second, third, and fourth layers, in order to guarantee the maximum orthogonality as in Equation 3.

Further, the CS allocation rule, by which the OCC index of a corresponding layer is calculated from the OCC index $n_{DMRS}^{OCC}$ of the first layer, is a proper method capable of reducing inter-layer interference, if the total number of layers is taken into consideration and the OCC values allocated to the layers have the maximum orthogonality in relation to possible preset CS values. To this end, only for discriminating the layers, alternating OCC values would guarantee the maximum orthogonality. Thus, for example, if the OCC index value of the first layer is 0, the OCC index value of the second layer may be 1, the OCC index value of the third layer may be 0, and the OCC index value of the fourth layer may be 1. However, for discrimination between two UEs in the MU-MIMO, each UE should have the same OCC index in all the layers. Thus, if UE #1 has an OCC index of 0 while UE #2 has an OCC index of 1 in the MU-MIMO environment, UE #1 should have the OCC index of 0 for all the layers and UE #2 should have the OCC index of 1 for all the layers. In order to achieve simultaneously optimized OCC allocation in discrimination between multiple UEs in the MU-MIMO and in discrimination of each layer in the SU-MIMO, the division scheme described above with reference to FIG. 4 may be taken into consideration. In this event, in rank 2, since the effect is insignificant, the OCC has the same index value in the first and second layers while a different index value in the third and fourth layers. Equation 4 defined below shows an example of the OCC allocation rule, in which the OCC values allocated to the layers have the maximum orthogonality in relation to possible preset CS values, according to the number of layers, and which achieves simultaneously optimized OCC allocation in discrimination between multiple UEs in the MU-MIMO and in discrimination of each layer in the SU-MIMO.

$n_{DMRS}^{OCC}$: OCC index of the 1$^{st}$ layer $$n_{DMRS}^{OCC} = 0 \rightarrow [+1, +1], n_{DMRS}^{OCC} = 1 \rightarrow [+1, -1]$$

1) In the case of Rank 2

$$\{n_{DMRS}^{OCC} \text{ of the 1}^{st} \text{ layer}, n_{DMRS}^{OCC} \text{ of the 2}^{nd}$$
$$\text{layer}\} = \{n_{DMRS}^{OCC}, n_{DMRS}^{OCC}\}$$

2) In the case of Rank 3

$$\{n_{DMRS}^{OCC} \text{ of the 1}^{st} \text{ layer}, n_{DMRS}^{OCC} \text{ of the 2}^{nd} \text{ layer},$$
$$n_{DMRS}^{OCC} \text{ of the 3}^{rd} \text{ layer}\} = \{n_{DMRS}^{OCC},$$
$$n_{DMRS}^{OCC}, 1 - n_{DMRS}^{OCC}\}$$

3) In the case of Rank 4

$$\{n_{DMRS}^{OCC} \text{ of the 1}^{st} \text{ layer}, n_{DMRS}^{OCC} \text{ of the 2}^{nd} \text{ layer},$$
$$n_{DMRS}^{OCC} \text{ of the 3}^{rd} \text{ layer}, n_{DMRS}^{OCC} \text{ of the 4}^{th}$$
$$\text{layer}\} = \{n_{DMRS}^{OCC}, n_{DMRS}^{OCC}, 1 - n_{DMRS}^{OCC},$$
$$1 - n_{DMRS}^{OCC}\} \qquad \text{[Equation 4]}$$

Table 6 shows an example of CS parameter values and OCC indexes in the layers configured through allocation thereof according to Equations 3 and 4. In Table 6, the value scheduled and signaled by a higher signaling layer is the CS parameter for $n_{DMRS}^{(2)}$ of the first layer. In case 5 of Table 6, UE A and UE B share the same bandwidth (equal bandwidth resource allocation). In this event, UE A and UE B receive a CS parameter for $n_{DMRS}^{(2)}$ within one CS-OCC linkage group as the CS parameter value of the first layer, through which they are identified by the cyclic shift value of the same OCC index. UE C and UE D receive a CS parameter for $n_{DMRS}^{(2)}$ within another CS-OCC linkage group different from that of the UE A and UE B, through which they are identified by an OCC index different from that of the UE A and UE B.

Thus, as shown in case 5 of Table 6, the number of UEs in the MU-MIMO environment may be two or more. However, in this event also, two UE groups having different bandwidths (non-equal bandwidth resource allocation) are inevitably required in order to apply the OCC. Further, a CS parameter for $n_{DMRS}^{(2)}$ within the same CS-OCC linkage group is scheduled and transmitted as the CS parameter value of the first layer to UEs within the same group. However, between UE groups having different allocated bandwidths, CS parameter for $n_{DMRS}^{(2)}$ within different CS-OCC linkage groups should be scheduled and transmitted as the CS parameter value of the first layer to the UEs.

TABLE 6

| UL DM-RS | | | | 1$^{st}$ layer | 2$^{nd}$ layer | 3$^{rd}$ layer | 4$^{th}$ layer |
|---|---|---|---|---|---|---|---|
| SU-MIMO | Case 1-2 Rank, 1 UE | UE A | $n_{DMRS}^{(2)}$ | 0 | 6 | | |
| | | | $n_{DMRS}^{OCC}$ | [+1, +1] | [+1, +1] | | |
| | Case 2-3 Rank, 1 UE | UE A | $n_{DMRS}^{(2)}$ | 0 | 4 | 8 | |
| | | | $n_{DMRS}^{OCC}$ | [+1, +1] | [+1, +1] | [+1, −1] | |

TABLE 6-continued

| | UL DM-RS | | $1^{st}$ layer | $2^{nd}$ layer | $3^{rd}$ layer | $4^{th}$ layer |
|---|---|---|---|---|---|---|
| MU-MIMO | Case 3-4 Rank, 1 UE | UE A $n_{DMRS}^{(2)}$ | 0 | 6 | 3 | 9 |
| | | $n_{DMRS}^{OCC}$ | [+1, +1] | [+1, +1] | [+1, −1] | [+1, −1] |
| | Case 4-2 Rank per UE, 2 UEs | UE A $n_{DMRS}^{(2)}$ | 0 | 6 | | |
| | | $n_{DMRS}^{OCC}$ | [+1, +1] | [+1, +1] | | |
| | | UE B $n_{DMRS}^{(2)}$ | 3 | 9 | | |
| | | $n_{DMRS}^{OCC}$ | [+1, −1] | [+1, −1] | | |
| | Case 5-1/2/4 Rank per UE, 3 UEs | UE A $n_{DMRS}^{(2)}$ | 0 | | | |
| | | $n_{DMRS}^{OCC}$ | [+1, +1] | | | |
| | | UE B $n_{DMRS}^{(2)}$ | 6 | 9 | | |
| | | $n_{DMRS}^{OCC}$ | [+1, +1] | [+1, +1] | | |
| | | UE C $n_{DMRS}^{(2)}$ | 2 | 5 | | |
| | | $n_{DMRS}^{OCC}$ | [+1, −1] | [+1, −1] | | |

If the calculation of the CS and OCC for the allocated layers has been completed, the UE generates a DM-RS sequence of each layer by applying Equation 1 to the CS value α determined for each layer and the base sequence for each layer. Then, the UE multiplies the generated DM-RS sequence by a orthogonal sequence value (+1 or −1) in the OCC index determined for each layer, so as to generate a final DM-RS sequence. Thus, if the OCC is [+1, +1], the value of Equation 1 is applied without change to the DM-RS sequence of the first symbol (or the first slot of one sub-frame if there is one symbol for each slot) and to the DM-RS sequence of the second symbol (or the second slot of one sub-frame if there is one symbol for each slot). If the OCC is [+1, −1], the value of Equation 1 is applied without change to the DM-RS sequence of the first symbol (or the first slot of one sub-frame if there is one symbol for each slot) while a value obtained by multiplying the value of Equation 1 by −1 is applied to the DM-RS sequence of the second symbol (or the second slot of one sub-frame if there is one symbol for each slot).

The CS and OCC allocation rule described above, which achieves simultaneously optimized OCC allocation in discrimination between multiple UEs in the MU-MIMO and in discrimination of each layer in the SU-MIMO, supports a rank number of 4 or less for each UE in the SU-MIMO and supports a rank number of 2 or less for each UE in the MU-MIMO. If the rule can support a rank number of 4 or less for each UE in the MU-MIMO, it is possible to achieve simultaneously optimized CS and OCC allocation in discrimination between multiple UEs in the MU-MIMO and in discrimination of each layer in the SU-MIMO, if different CS and OCC allocation rules are employed for the SU-MIMO and the MU-MIMO. Thus, for discriminating the layers, alternating OCC index values of the layers would guarantee the maximum orthogonality. For example, if the OCC index value of the first layer is 0, the OCC index value of the second layer may be 1, the OCC index value of the third layer may be 0, and the OCC index value of the fourth layer may be 1. Further, for discrimination between two UEs in the MU-MIMO, each UE may have the same OCC index in all the layers. Thus, if UE #1 has an OCC index of 0 while UE #2 has an OCC index of 1 in the MU-MIMO environment, UE #1 should have the OCC index of 0 for all the layers and UE #2 should have the OCC index of 1 for all the layers.

In order to achieve the simultaneously optimized OCC allocation in discrimination between multiple UEs in the MU-MIMO and in discrimination of each layer in the SU-MIMO, different CS and OCC allocation rules in the SU-MIMO and in the MU-MIMO may be required in order to support a rank number of 4 or less for each UE not only in the SU-MIMO but also in the MU-MIMO. To this end, it may be necessary to provide an additional 1 bit signaling for the SU-MIMO and the MU-MIMO or a system enabling the UE to determine by itself whether the UE is in the SU-MIMO state or the MU-MIMO state. The present disclosure has discussed implicitly different CS and OCC allocation rules in the SU-MIMO and the MU-MIMO even without additional signaling in a typical UE, which may not determine by itself whether the UE is in the SU-MIMO state or the MU-MIMO state. In step S525 of FIG. 5, the eNodeB determines whether the UE can identify that the UE is in the MU-MIMO state. Further, even in a non-transparent system in which the UE can identify by itself that the UE is in the MU-MIMO state, the eNodeB performs step S540. Likewise, if the network is characterized in that the UE is informed that the UE is in the SU-MIMO state or MU-MIMO state although the UE cannot determine by itself, for example, even if the UE can determine through a sequence or sequence group hopping, the eNodeB may perform step S540. If the UE cannot determine by itself but can be informed through a CS-OCC linkage rule, such a linkage rule can be applied.

Further, the eNodeB can be designed either for step S540 (including S530) of FIG. 5 or for step S545 (including S535) of FIG. 5. Thus, each eNodeB may be configured and operate either in consideration of steps S530 and S540, which are performed if the UE can directly or indirectly determine whether the UE is in the SU-MIMO state or MU-MIMO state, or in consideration of steps S535 and S545, which are performed if the UE cannot directly or indirectly determine whether the UE is in the SU-MIMO state or MU-MIMO state. In other words, the process of FIG. 5 includes two procedures including a determination step. If one procedure is selected according to the situation, the two procedures may be separated without the determination step, and the eNodeB may be configured for only one procedure.

Figure 6:
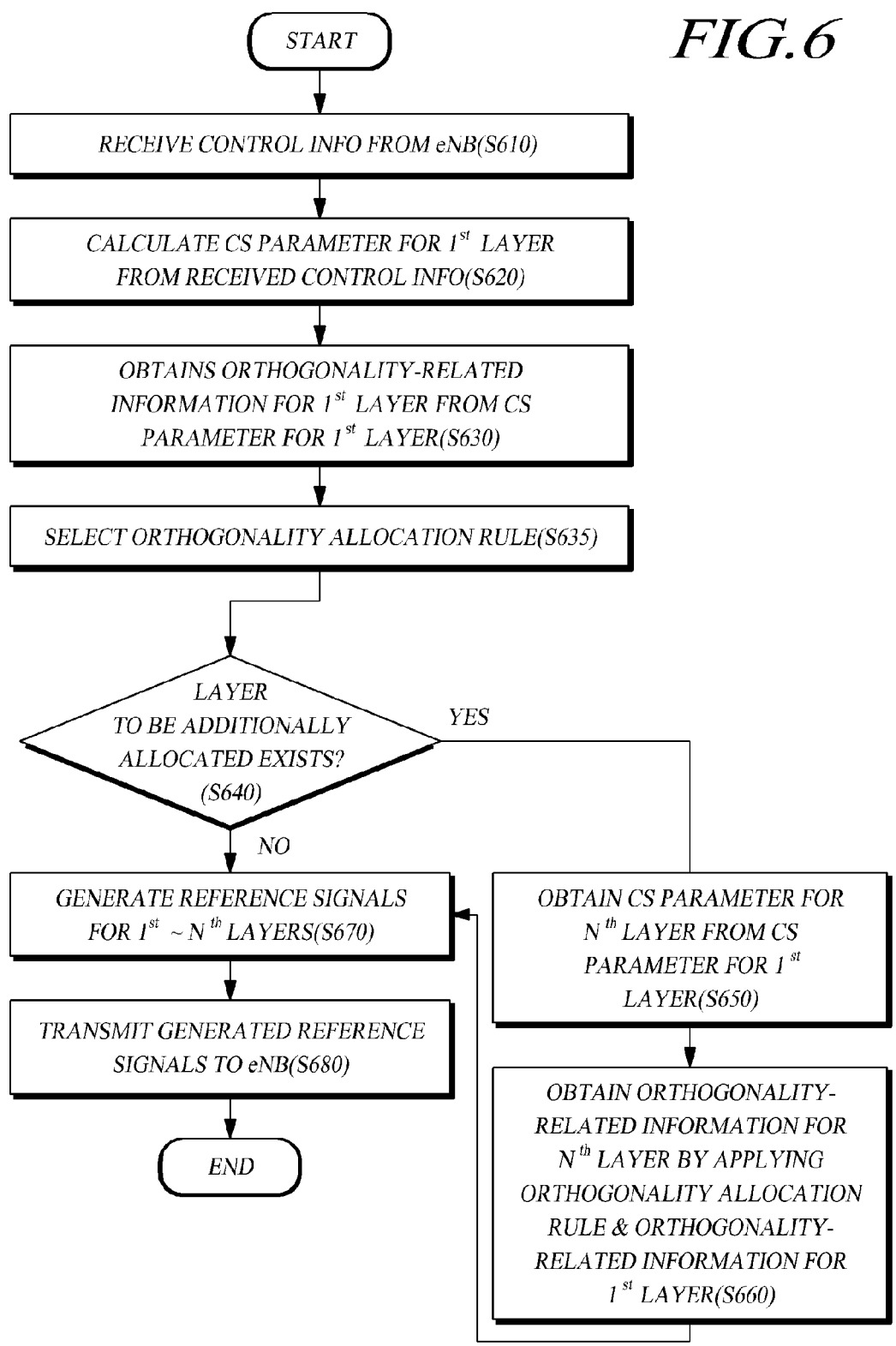
FIG. 6 is a flowchart illustrating a process in which a UE infers an OCC and orthogonality allocation rule from control information transmitted by an eNodeB and sets the OCC and orthogonality allocation rule according to an exemplary embodiment.

FIG. 6 is a flowchart illustrating a process in which a UE infers an OCC and orthogonality allocation rule from control information transmitted by an eNodeB and sets the OCC and orthogonality allocation rule according to an exemplary embodiment.

Briefly describing the process, a UE using one or more layers receives a cyclic shift parameter for a first layer from an eNodeB, and calculates information relating to the orthogonality with respect to the first layer from the received cyclic shift parameter for the first layer. If there is a layer to be additionally allocated, the UE calculates a cyclic shift parameter for the layer to be additionally allocated from the cyclic shift parameter for the first layer, and then selects an orthogonality allocation rule. Further, the UE obtains orthogonality-related information for the additionally allocated layer by using the orthogonality allocation rule and orthogonality-related information for the first layer, generates a reference signal for the first layer by using the orthogonality-related information for the first layer and the cyclic shift parameter for the first layer, generates a reference signal for the additionally allocated layer by using the orthogonality-related information for the additionally allocated layer and the cyclic shift parameter for the additionally allocated layer, and then transmits the generated reference signal to the eNodeB.

In more detail, the UE first receives control information from the eNodeB (step S610). The control information may be information carried by a PDCCH. Then, the UE obtains the cyclic shift parameter for the first layer from the control information (step S620). In the case of the PDCCH, the DCI format 0 may include the cyclic shift parameter for the first layer. Further, the UE obtains the orthogonality-related information for the first layer from the cyclic shift parameter for the first layer (step S630). An example of the orthogonality-related information for the first layer may be indication information for the OCC. It is possible to obtain the orthogonality-related information for the first layer through a group including the cyclic shift parameter for the first layer or a predetermined function from the cyclic shift parameter for the first layer. Thus, the cyclic shift parameter for the first layer belongs to a particular cyclic shift parameter group, and the orthogonality-related information for the first layer is orthogonality-related information relating to the particular cyclic shift parameter group to which the cyclic shift parameter for the first layer belongs.

The cyclic shift parameter for the first layer and the orthogonality-related information for the first layer are used to generate the reference signal for the first layer.

Further, the UE selects an orthogonality allocation rule necessary for allocation or calculation of the orthogonality-related information for layers (step S635). As described above with reference to FIG. 4, the orthogonality allocation rule is a rule for determining the scheme of allocating orthogonality-related information to other layers by using the orthogonality-related information for the first layer. The orthogonality allocation rule may include a uniform scheme and a non-uniform scheme. Further, the selection of the orthogonality allocation rule may include a step in which the UE identifies the current access state or infers the current access state from the sequence hopping or the sequence group hopping. Further, as another scheme, it is possible to select the orthogonality allocation rule to apply, through the cyclic shift parameter for the first layer. The scheme of selecting the orthogonality allocation rule will be described later in more detail.

Then, the UE determines whether there is a layer to be additionally allocated (step S640). If there is a layer to be additionally allocated, the UE obtains a cyclic shift parameter for the layer to be additionally allocated from the cyclic shift parameter for the first layer (step S650). Likewise, by using the selected orthogonality allocation rule and the orthogonality-related information for the first layer, the UE obtains the orthogonality-related information for the layer to be additionally allocated (step S660).

Further, if there is no layer to be additionally allocated, the UE generates reference signals for the allocated layers (step S670). Then, the UE transmits the generated reference signals to the eNodeB (step S680). An example of the generated reference signals may be a DM-RS.

The orthogonality-related information may be information indicating an orthogonality cover code.

Figure 7:
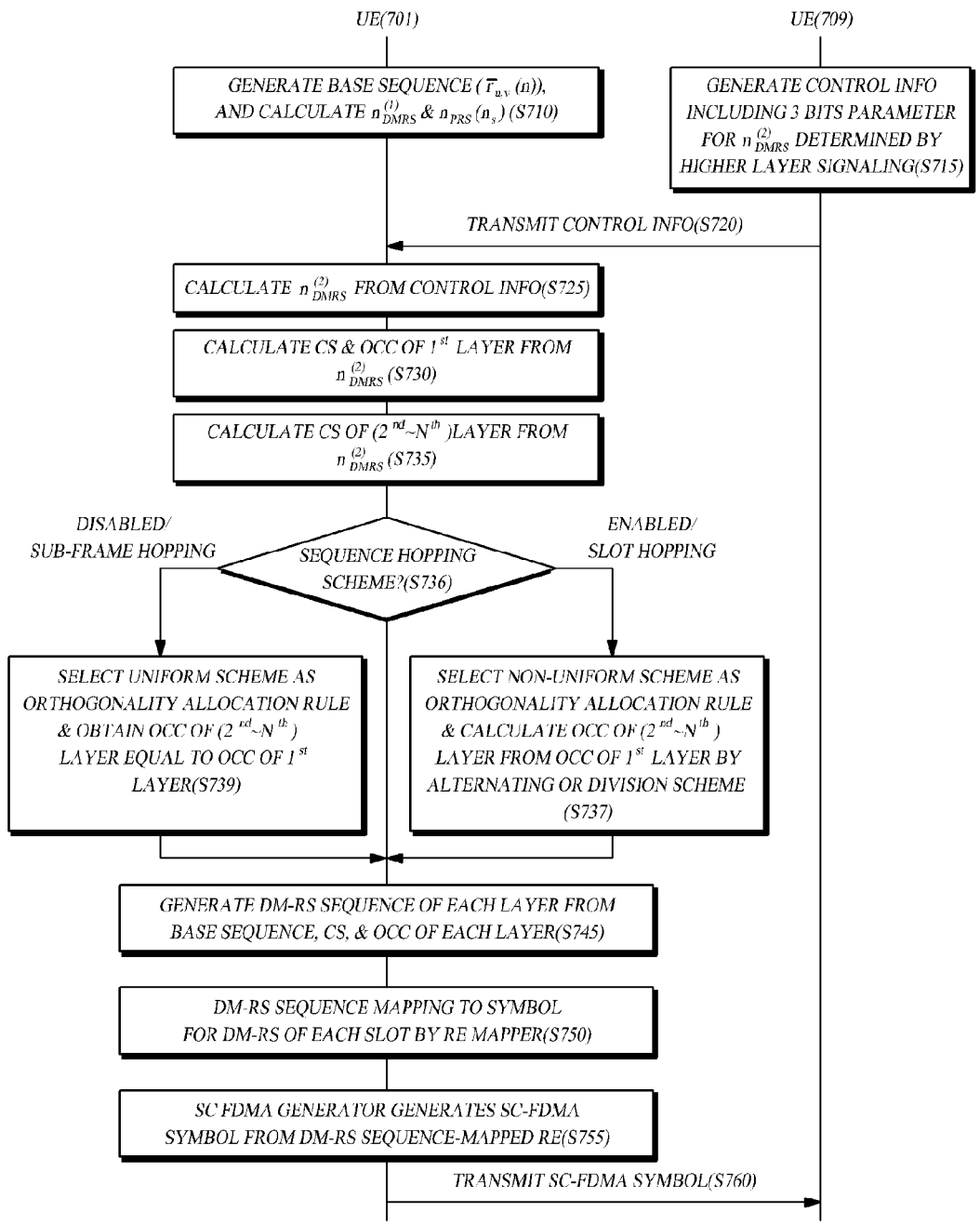
FIG. 7 is a flowchart illustrating a process in which a UE obtains an OCC by selecting an orthogonality allocation rule from control information transmitted by an eNodeB according to an exemplary embodiment.
Figure 8:
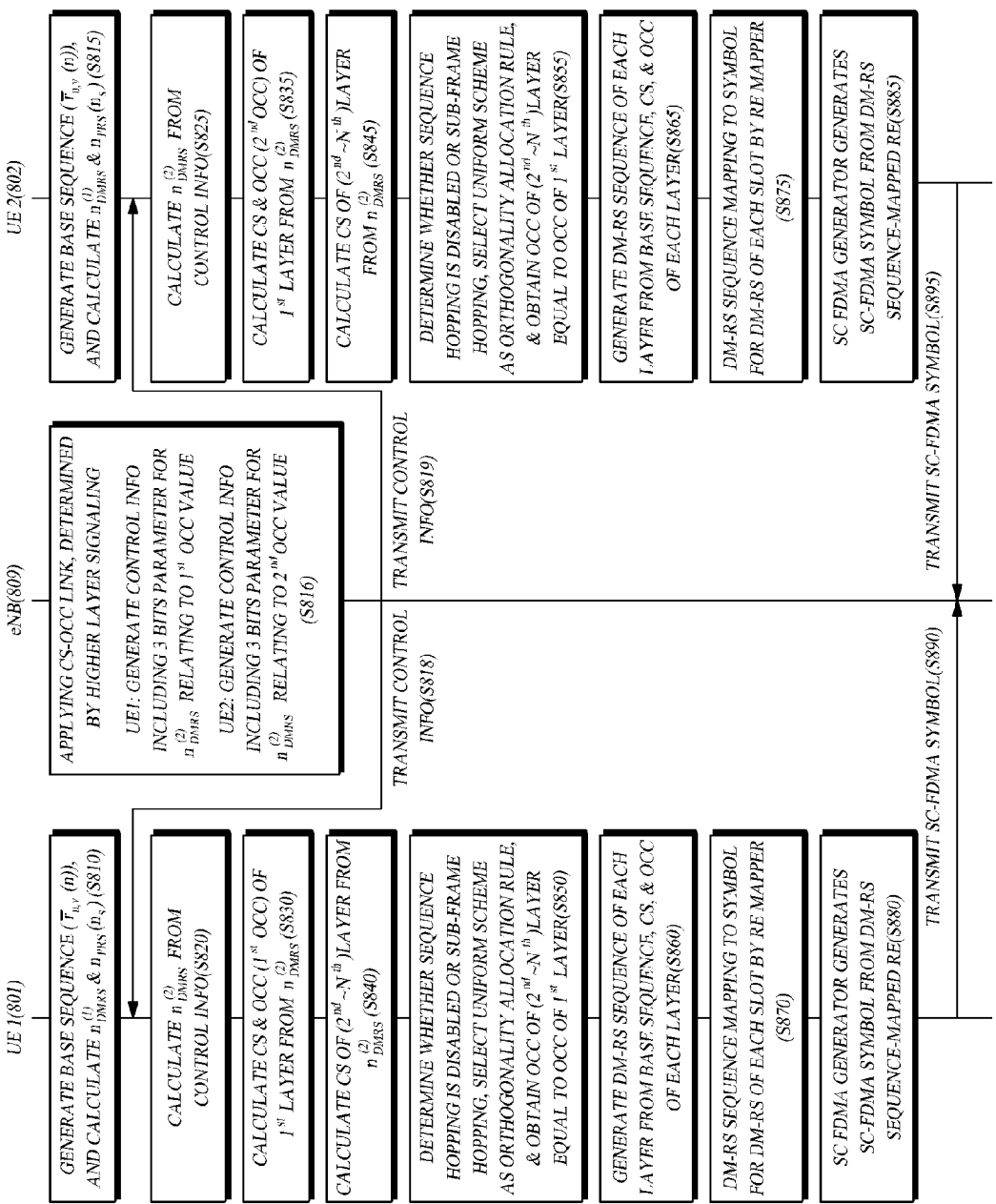
FIG. 8 is a flowchart illustrating a process in which a UE in an MU-MIMO environment obtains an OCC by selecting an orthogonality allocation rule from control information transmitted by an eNodeB according to an exemplary embodiment.

FIGS. 7 and 8 are flowcharts illustrating a process of allocating an OCC value to each layer by selecting an orthogonality allocation rule by using sequence hopping information, and generating and transmitting a reference signal by allocating a CS value to each layer.

The selection of the orthogonality allocation rule in FIGS. 7 and 8 uses different CS and OCC allocation rules according to the sequence or sequence group hopping scheme. Thus, according to the hopping scheme, the DM-RS sequence may apply the SU-MIMO scheme, an equal sized Resource allocation type MU-MIMO scheme, or a non-equal sized Resource allocation type MU-MIMO scheme. For example, if the hopping scheme for the DM-RS sequence is "enabled" in the LTE Rel-8 system, that is, in the case of hopping by the unit of slot, the CS and OCC allocation rule defined by Equation 5 described below is applied. This corresponds to an application of the SU-MIMO scheme (including the equal sized Resource allocation type MU-MIMO scheme) as the multiple access scheme. If the hopping scheme for the DM-RS sequence is "disabled" in the LTE Rel-8 system or is not the hopping by the unit of slot in the in the existing LTE Rel-8 system (e.g. hopping by the unit of sub-frame), the CS and OCC allocation rule defined by Equation 6 described below is applied. This corresponds to an application of the MU-MIMO scheme (especially, the non-equal sized Resource allocation type MU-MIMO scheme) as the multiple access scheme.

FIG. 7 is a flowchart illustrating a process in which a UE obtains an OCC by selecting an orthogonality allocation rule from control information transmitted by an eNodeB according to an exemplary embodiment.

The UE 701 calculates $n_{PRS}(n_s)$ as in Equation 2 and $n_{DMRS}^{(1)}$ given by a higher layer as in Table 1 as cyclic shift parameter values necessary for obtaining the CS values and the base sequence $\bar{r}_{u,v}(n)$ based on a zadoff-chu sequence for the UL DM-RS sequence (step S710). The base sequence has a value changing according to the group number u, the base sequence number v within the group, and the length n of the sequence. However, UL DM-RSs occupying the same frequency bandwidth at the same slot time in the same eNodeB (or cell) have the same base sequence. As a result, the parameter actually scheduled by a higher signaling layer and transmitted through an eNodeB is $n_{DMRS}^{(2)}$, which determines the CS value of the UL DM-RS.

Step S710 reflects the multiple access state or the configuration of the system, and may be performed either after or in combination with the various steps of FIG. 7.

The eNodeB generates a control signal, which includes DCI format 0 including a 3 bits CS parameter for value of $n_{DMRS}^{(2)}$ determined for each UE by a higher signaling layer of the system (step S715). Specifically, the higher signaling layer determines whether each UE to be scheduled will operate in an SU-MIMO (including the equal sized Resource allocation type MU-MIMO) state or an MU-MIMO (including the non-equal sized Resource allocation type MU-MIMO) state. If the UE is to operate in an SU-MIMO (including the equal sized Resource allocation type MU-MIMO) state, the eNodeB transmits a 3 bits CS parameter for value of $n_{DMRS}^{(2)}$ regardless of the CS-OCC linkage group of Table 5. Thus, in the case of the SU-MIMO, the 3 bits CS parameter for value of $n_{DMRS}^{(2)}$ determined for each UE by the higher signaling layer of the system is one of the eight types of values including the values of the CS-OCC linkage group A and the CS-OCC linkage group B as shown in Table 5, and the eNodeB transmits the 3 bits CS parameter for value of $n_{DMRS}^{(2)}$ to each UE.

The eNodeB transmits the generated control information (step S720). Specifically, this 3 bits parameter may be carried by the CS field of the DCI format 0.

The UE calculates CS parameter value ($n_{DMRS}^{(2)}$) from the received control information (step S725).

Thereafter, the UE calculates the CS value and the OCC value of the first layer, wherein the OCC can be obtained by calculating $n_{cs}$ and $\alpha$ from the $n_{DMRS}^{(2)}$ by using Equation 2 and then calculating the $n_{DMRS}^{OCC}$ by using the $n_{DMRS}^{(2)}$ in Table 5 (step S730). For example, if the $n_{DMRS}^{(2)}$ is 0, the $n_{DMRS}^{OCC}$ is 0 by Table 5, which may correspond to an OCC of [+1, +1]. For example, if the transmitted CS parameter value $n_{DMRS}^{(2)}$ is 0, 6, 4, or 10, which correspond to the CS-OCC linkage group A in Table 5, the $n_{DMRS}^{OCC}$ automatically calculated as 0 even without receiving additional information. In contrast, if the transmitted CS parameter value $n_{DMRS}^{(2)}$ is 3, 9, 2, or 8, which correspond to the CS-OCC linkage group B in Table 5, the $n_{DMRS}^{OCC}$ is automatically calculated as 1 even without receiving additional information. In Table 5, if the $n_{DMRS}^{OCC}$ is 0, it may correspond to an OCC {+1, +1}. If the n is 1, it may correspond to an OCC {+1, −1}. However, the mathematical expression and values of the parameters expressing the OCC index are not limited as long as the meaning and contents thereof are not changed.

If the CS and OCC values for the first layer have been set, the UE determines if there is any layer to be additionally allocated. If there is a layer to be additionally allocated, the UE calculates the CS values $\alpha$ of the layer or layers to be additionally allocated, which may include the $2^{nd}$~$N^{th}$ layers, from the CS parameter for $n_{DMRS}^{(2)}$ of the first layer (step S735).

In this event, it is possible to apply a rule (CS allocation rule) for calculating the CS values $\alpha$ of a corresponding layer from the CS parameter for $n_{DMRS}^{(2)}$ of the first layer. According to the CS allocation rule, the CS values allocated to the layers are set to have distances as large as possible, so as to reduce the inter-layer interference. Equation 3 shows an example of the CS allocation rule, by which the CS values allocated to the layers are set to have distances as large as possible. Equation 3 shows two representative cases as an example of the CS allocation rule. However, the CS allocation rule is not limited by the two cases of Equation 3 and may be configured in various ways within the range capable of guaranteeing the orthogonality as much as possible in each layer.

After the CS allocation is completed, it is necessary to select an orthogonality allocation rule. Therefore, the UE identifies the sequence hopping scheme (step S736). As a result of the identification, if the sequence hopping scheme is "enable" or hopping by the unit of slot, it is possible to infer that the access scheme is the SU-MIMO scheme or the equal sized Resource allocation type MU-MIMO scheme. In this event, since it is possible to allocate the OCC in order to discriminate the layer of the UE, the non-uniform scheme, that is, the alternating scheme or the division scheme may be selected as the orthogonality allocation rule, and the OCC values of the other layers may be calculated by the selected scheme (step S737). This will be discussed by Equation 5 below.

If the sequence hopping scheme is "disable" or hopping by the unit of sub-frame, it is possible to infer that the access scheme is the MU-MIMO scheme, more specifically, the non-equal sized Resource allocation type MU-MIMO scheme. In this event, since it is possible to allocate the OCC in order to discriminate between the UEs, the uniform scheme may be selected as the orthogonality allocation rule so as to obtain the OCC values of the other layers, which are the same as the OCC value of the first layer (step S739). This will be discussed by Equation 6 below.

Equation 5 shows CS/OCC values of each layer by the orthogonality allocation rule and CS allocation of the frequency hopping by the unit of slot (or activated sequence hopping). The orthogonality allocation rule in Equation 5 corresponds to a non-uniform scheme, and specifically presents an alternating scheme.

$n_{DMRS}^{(2)}$: CS parameter of the $1^{st}$ layer $n_{DMRS}^{(2)} \in \{0, 6, 3, 4, 2, 8, 10, 9\}$ 1) In the case of Rank 2

$\{n_{DMRS}^{(2)}$ of the $1^{st}$ layer, $n_{DMRS}^{(2)}$ of the $2^{nd}$ layer$\} = \{n_{DMRS}^{(2)}, (n_{DMRS}^{(2)}+6) \bmod 12\}$ 2) In the case of Rank 3

$\{n_{DMRS}^{(2)}$ of the $1^{st}$ layer, $n_{DMRS}^{(2)}$ of the $2^{nd}$ layer, $n_{DMRS}^{(2)}$ of the $3^{rd}$ layer$\} = \{n_{DMRS}^{(2)}, (n_{DMRS}^{(2)}+4) \bmod 12, (n_{DMRS}^{(2)}+8) \bmod 12\}$ 3) In the case of Rank 4

$\{n_{DMRS}^{(2)}$ of the $1^{st}$ layer, $n_{DMRS}^{(2)}$ of the $2^{nd}$ layer, $n_{DMRS}^{(2)}$ of the $3^{rd}$ layer, $n_{DMRS}^{(2)}$ of the $4^{th}$ layer$\} = \{n_{DMRS}^{(2)}, (n_{DMRS}^{(2)}+3) \bmod 12, (n_{DMRS}^{(2)}+6) \bmod 12, (n_{DMRS}^{(2)}+9) \bmod 12\}$ $n_{DMRS}^{OCC}$: OCC index of the $1^{st}$ layer $n_{DMRS}^{OCC} = 0 \rightarrow [+1, +1]$, $n_{DMRS}^{OCC} = 1 \rightarrow [+1, -1]$ 1) In the case of Rank 2

$\{n_{DMRS}^{OCC}$ of the $1^{st}$ layer, $n_{DMRS}^{OCC}$ of the $2^{nd}$ layer$\} = \{n_{DMRS}^{OCC}, 1-n_{DMRS}^{(2)}\}$ 2) In the case of Rank 3

$\{n_{DMRS}^{OCC}$ of the $1^{st}$ layer, $n_{DMRS}^{OCC}$ of the $2^{nd}$ layer, $n_{DMRS}^{OCC}$ of the $3^{rd}$ layer$\} = \{n_{DMRS}^{OCC}, 1-n_{DMRS}^{OCC}, n_{DMRS}^{OCC}\}$ 3) In the case of Rank 4

$\{n_{DMRS}^{OCC}$ of the $1^{st}$ layer, $n_{DMRS}^{OCC}$ of the $2^{nd}$ layer, $n_{DMRS}^{OCC}$ of the $3^{rd}$ layer, $n_{DMRS}^{OCC}$ of the $4^{th}$ layer$\} = \{n_{DMRS}^{OCC}, 1-n_{DMRS}^{OCC}, n_{DMRS}^{OCC}, 1-n_{DMRS}^{OCC}\}$ [Equation 5]

Equation 6 shows CS/OCC values of each layer by the orthogonality allocation rule and CS allocation of the frequency hopping by the unit of sub-frame (or inactivated sequence hopping). In Equation 6, two UEs exist and CS parameter values of the first layer to be allocated to the UEs are different values. As a result, the two UEs have different OCC values, which are identically applied to all the layers in the UEs. Therefore, the OCC values included in all the layers of UE A are the same and the OCC values included in all the layers of UE B are also the same. However, the OCC value of UE A and the OCC value of UE B are different from each other, which can more clearly guarantee the orthogonality between reference signals of UE A and UE B.

$n_{DMRS}^{(2)}$: CS parameter of the $1^{st}$ layer $n_{DMRS}^{(2)}$ of the $1^{st}$ layer for UE A $\in \{0, 6, 4, 10\}$ $n_{DMRS}^{(2)}$ of the $1^{st}$ layer for UE B $\in \{3, 9, 2, 8\}$ 1) In the case of Rank 2

$\{n_{DMRS}^{(2)}$ of the $1^{st}$ layer, $n_{DMRS}^{(2)}$ of the $2^{nd}$ layer$\} = \{n_{DMRS}^{(2)}, (n_{DMRS}^{(2)}+6) \bmod 12\}$ 2) In the case of Rank 3

$\{n_{DMRS}^{(2)}$ of the $1^{st}$ layer, $n_{DMRS}^{(2)}$ of the $2^{nd}$ layer, $n_{DMRS}^{(2)}$ of the $3^{rd}$ layer$\} = \{n_{DMRS}^{(2)}, (n_{DMRS}^{(2)}+4) \bmod 12, (n_{DMRS}^{(2)}+8) \bmod 12\}$ 3) In the case of Rank 4

$\{n_{DMRS}^{(2)}$ of the $1^{st}$ layer, $n_{DMRS}^{(2)}$ of the $2^{nd}$ layer, $n_{DMRS}^{(2)}$ of the $3^{rd}$ layer, $n_{DMRS}^{(2)}$ of the $4^{th}$ layer$\} = \{n_{DMRS}^{(2)}, (n_{DMRS}^{(2)}+3) \bmod 12, (n_{DMRS}^{(2)}+6) \bmod 12, (n_{DMRS}^{(2)}+9) \bmod 12\}$ $n_{DMRS}^{OCC}$: OCC index of the $1^{st}$ layer $n_{DMRS}^{OCC} = 0 \rightarrow [+1, +1]$, $n_{DMRS}^{OCC} = 1 \rightarrow [+1, -1]$ 1) In the case of Rank 2

$$\{n_{DMRS}^{OCC} \text{ of the } 1^{st} \text{ layer}, n_{DMRS}^{OCC} \text{ of the } 2^{nd} \text{ layer}\} = \{n_{DMRS}^{OCC}, n_{DMRS}^{OCC}\}$$

2) In the case of Rank 3

$$\{n_{DMRS}^{OCC} \text{ of the } 1^{st} \text{ layer}, n_{DMRS}^{OCC} \text{ of the } 2^{nd} \text{ layer}, n_{DMRS}^{OCC} \text{ of the } 3^{rd} \text{ layer}\} = \{n_{DMRS}^{OCC}, n_{DMRS}^{OCC}, n_{DMRS}^{OCC}\}$$

3) In the case of Rank 4

$$\{n_{DMRS}^{OCC} \text{ of the } 1^{st} \text{ layer}, n_{DMRS}^{OCC} \text{ of the } 2^{nd} \text{ layer}, n_{DMRS}^{OCC} \text{ of the } 3^{rd} \text{ layer}, n_{DMRS}^{OCC} \text{ of the } 4^{th} \text{ layer}\} = \{n_{DMRS}^{OCC}, n_{DMRS}^{OCC}, n_{DMRS}^{OCC}, n_{DMRS}^{OCC}\}$$

[Equation 6]

If the calculation of the CS and OCC for the allocated layers has been completed, the UE generates a DM-RS sequence of each layer by applying the Equations described above to the CS value α determined for each layer and the base sequence for each layer. Then, the UE multiplies the generated DM-RS sequence by a orthogonal sequence value (+1 or −1) in the OCC index determined for each layer, so as to generate a final DM-RS sequence (step S745). For example, if Equation 5 is applied and the OCC is [+1, +1], the value of Equation 5 is applied without change to the DM-RS sequence of the first symbol (or the first slot of one sub-frame if there is one symbol for each slot) and to the DM-RS sequence of the second symbol (or the second slot of one sub-frame if there is one symbol for each slot). However, if the OCC is [+1, −1], the value of Equation 5 is applied without change to the DM-RS sequence of the first symbol (or the first slot of one sub-frame if there is one symbol for each slot) while a value obtained by multiplying the value of Equation 5 by −1 is applied to the DM-RS sequence of the second symbol (or the second slot of one sub-frame if there is one symbol for each slot).

Further, the generated DM-RS sequence is mapped to a corresponding symbol of each slot by a resource element mapper (step S750). In the case of DM-RS relating to the PUSCH, the symbol corresponds to the fourth symbol among the seven symbols of each slot if a normal CP is used and corresponds to the third symbol among the seven symbols of each slot if an extended CP is used. In the case of DM-RS relating to the PUCCH, the corresponding symbol may include a maximum of three symbols in each slot, the number and locations of corresponding symbols depend on the type of CP and the format of PUCCH as shown in Table 3 described above. If the mapping has been completed, an SC-FDMA generator generates an SC-FDMA symbol from an RE, to which the DM-RS sequence has been mapped (step S755), and then transmits the generated DM-RS signal to the eNodeB (S760).

If the hopping scheme for the DM-RS sequence is "enabled" in the LTE Rel-8 system, that is, in the case of hopping by the unit of slot, the layers are allocated different OCC index values for discrimination between the layers. Specifically, as noted from Equation 5, alternating values are allocated to the OCC indexes of the layers. That is, for example, if the OCC index value of the first layer is 0, the OCC index value of the second layer may be 1, the OCC index value of the third layer may be 0, and the OCC index value of the fourth layer may be 1. In this event, the CS parameter for the first layer scheduled and signaled by the higher signaling layer is one of the eight types of values in Table 2. The orthogonality allocation rule of Equation 5 is the alternating scheme of the non-uniform scheme and may be modified to the division scheme of the non-uniform scheme as shown in Equation 7 below. In this event, the same OCC value is applied to the first two layers, and another OCC value is applied to the other two layers, so as to divide the layers by the two OCC values.

$n_{DMRS}^{(2)}$: CS parameter of the $1^{st}$ layer, $n_{DMRS}^{(2)} \in \{0, 6, 3, 4, 2, 8, 10, 9\}$ 1) In the case of Rank 2

$$\{n_{DMRS}^{(2)} \text{ of the } 1^{st} \text{ layer}, n_{DMRS}^{(2)} \text{ of the } 2^{nd} \text{ layer}\} = \{n_{DMRS}^{(2)}, (n_{DMRS}^{(2)}+6) \bmod 12\}$$

2) In the case of Rank 3

$$\{n_{DMRS}^{(2)} \text{ of the } 1^{st} \text{ layer}, n_{DMRS}^{(2)} \text{ of the } 2^{nd} \text{ layer}, n_{DMRS}^{(2)} \text{ of the } 3^{rd} \text{ layer}\} = \{n_{DMRS}^{(2)}, (n_{DMRS}^{(2)}+4) \bmod 12, (n_{DMRS}^{(2)}+8) \bmod 12\}$$

3) In the case of Rank 4

$$\{n_{DMRS}^{(2)} \text{ of the } 1^{st} \text{ layer}, n_{DMRS}^{(2)} \text{ of the } 2^{nd} \text{ layer}, n_{DMRS}^{(2)} \text{ of the } 3^{rd} \text{ layer}, n_{DMRS}^{(2)} \text{ of the } 4^{th} \text{ layer}\} = \{n_{DMRS}^{(2)}, (n_{DMRS}^{(2)}+6) \bmod 12, (n_{DMRS}^{(2)}+3) \bmod 12, (n_{DMRS}^{(2)}+9) \bmod 12\}$$

$n_{DMRS}^{OCC}$: OCC index of the $1^{st}$ layer $n_{DMRS}^{OCC}=0 \rightarrow [+1, +1]$, $n_{DMRS}^{OCC}=1 \rightarrow [+1, -1]$ 1) In the case of Rank 2

$$\{n_{DMRS}^{OCC} \text{ of the } 1^{st} \text{ layer}, n_{DMRS}^{OCC} \text{ of the } 2^{nd} \text{ layer}\} = \{n_{DMRS}^{OCC}, n_{DMRS}^{OCC}\}$$

2) In the case of Rank 3

$$\{n_{DMRS}^{OCC} \text{ of the } 1^{st} \text{ layer}, n_{DMRS}^{OCC} \text{ of the } 2^{nd} \text{ layer}, n_{DMRS}^{OCC} \text{ of the } 3^{rd} \text{ layer}\} = \{n_{DMRS}^{OCC}, n_{DMRS}^{OCC}, 1-n_{DMRS}^{OCC}\}$$

3) In the case of Rank 4

$$\{n_{DMRS}^{OCC} \text{ of the } 1^{st} \text{ layer}, n_{DMRS}^{OCC} \text{ of the } 2^{nd} \text{ layer}, n_{DMRS}^{OCC} \text{ of the } 3^{rd} \text{ layer}, n_{DMRS}^{OCC} \text{ of the } 4^{th} \text{ layer}\} = \{n_{DMRS}^{OCC}, n_{DMRS}^{OCC}, 1-n_{DMRS}^{OCC}, 1-n_{DMRS}^{OCC}\}$$

[Equation 7]

If the hopping scheme for the DM-RS sequence is "disabled" in the LTE Rel-8 system or is not the hopping by the unit of slot in the in the existing LTE Rel-8 system (e.g. hopping by the unit of sub-frame), the layers are allocated the same OCC index while the UEs are allocated different OCC indexes as in Equation 6 for discrimination between the UEs in the MU-MIMO. That is, if UE #1 has an OCC index of 0 while UE #2 has an OCC index of 1 in the MU-MIMO environment, UE #1 should have the OCC index of 0 for all the layers and UE #2 should have the OCC index of 1 for all the layers. In this event, the higher signaling layer schedules and transmits a 3 bits CS parameter for value of $n_{DMRS}^{(2)}$ in consideration of the CS-OCC linkage group as shown in Table 5 described above. That is, in the case of MU-MIMO, at the time of scheduling in order to determine the CS parameter value $n_{DMRS}^{(2)}$ for each UE by the system higher signaling layer, UEs may be scheduled to select CS parameter for $n_{DMRS}^{(2)}$ of different CS-OCC linkage groups. Especially, the two UEs having different allocated bandwidths (or non-equal bandwidth resource allocation) should be scheduled to inevitably receive CS parameters for $n_{DMRS}^{(2)}$ of different CS-OCC linkage groups (in the MU-MIMO environment, two UEs having the same allocated bandwidths (or equal bandwidth resource allocation) need not be scheduled to necessarily receive CS parameters for $n_{DMRS}^{(2)}$ of different CS-OCC linkage groups). In other words, if one UE is scheduled to receive one of the four CS parameters for $n_{DMRS}^{(2)}$ of CS-OCC linkage group A shown in Table 5, the other UE is scheduled to receive one of the four CS parameters for $n_{DMRS}^{(2)}$ of at CS-OCC linkage group B shown in Table 5.

For example, if UE #1 receives 0, which is one of the four CS parameter values $n_{DMRS}^{(2)}$ of CS-OCC linkage group A shown in Table 5, for the first layer, UE #2 receives 3, which is one of the four CS parameter values $n_{DMRS}^{(2)}$ of at CS-OCC linkage group B shown in Table 5, for the same layer. In the event, two different UEs inevitably have different OCC indexes in the MU-MIMO environment, by which they can be always discriminated from each other. As Equation 6 is related to Equation 5, Equation 8 defined below can be applied to the MU-MIMO also in relation to Equation 7.

$n_{DMRS}^{(2)}$: CS parameter of the 1$^{st}$ layer, $n_{DMRS}^{(2)} \in \{0, 6, 3, 4, 2, 8, 10, 9\}$ $n_{DMRS}^{(2)}$ of the 1$^{st}$ layer for UE A$\in \{0, 6, 4, 10\}$
$n_{DMRS}^{(2)}$ of the 1$^{st}$ layer for UE B$\in \{3, 9, 2, 8\}$ 1) In the case of Rank 2
$\{n_{DMRS}^{(2)}$ of the 1$^{st}$ layer,$n_{DMRS}^{(2)}$ of the 2$^{nd}$ layer$\}=$ $\{n_{DMRS}^{(2)},(n_{DMRS}^{(2)}+6)$mod $12\}$ 2) In the case of Rank 3

$\{n_{DMRS}^{(2)}$ of the 1$^{st}$ layer,$n_{DMRS}^{(2)}$ of the 2$^{nd}$ layer,
$n_{DMRS}^{(2)}$ of the 3$^{rd}$ layer$\}=\{n_{DMRS}^{(2)}$,
$(n_{DMRS}^{(2)}+4)$mod $12,(n_{DMRS}^{(2)}+8)$mod $12\}$ 3) In the case of Rank 4

$\{n_{DMRS}^{(2)}$ of the 1$^{st}$ layer,$n_{DMRS}^{(2)}$ of the 2$^{nd}$ layer,$n_{DMRS}^{(2)}$ of the 3$^{rd}$ layer,$n_{DMRS}^{(2)}$ of the 4$^{th}$ layer$\}=\{n_{DMRS}^{(2)},(n_{DMRS}^{(2)}+6)$mod $12$,
$(n_{DMRS}^{(2)}+3)$mod $12,(n_{DMRS}^{(2)}+9)$mod $12\}$ $n_{DMRS}^{OCC}$: OCC index of the 1$^{st}$ layer $n_{DMRS}^{OCC}=0 \rightarrow [+1, +1]$, $n_{DMRS}^{OCC}=1 \rightarrow [+1, -1]$ 1) In the case of Rank 2

$\{n_{DMRS}^{OCC}$ of the 1$^{st}$ layer,$n_{DMRS}^{OCC}$ of the 2$^{nd}$ layer$\}=\{n_{DMRS}^{OCC},n_{DMRS}^{OCC}\}$ 2) In the case of Rank 3

$\{n_{DMRS}^{OCC}$ of the 1$^{st}$ layer,$n_{DMRS}^{OCC}$ of the 2$^{nd}$ layer, $n_{DMRS}^{OCC}$ of the 3$^{rd}$ layer$\}=\{n_{DMRS}^{OCC},n_{DMRS}^{OCC},n_{DMRS}^{OCC}\}$ 3) In the case of Rank 4

$\{n_{DMRS}^{OCC}$ of the 1$^{st}$ layer,$n_{DMRS}^{OCC}$ of the 2$^{nd}$ layer, $n_{DMRS}^{OCC}$ of the 3$^{rd}$ layer,$n_{DMRS}^{OCC}$ of the 4$^{th}$ layer$\}=\{n_{DMRS}^{OCC},n_{DMRS}^{OCC},n_{DMRS}^{OCC},n_{DMRS}^{OCC}\}$ [Equation 8]

FIG. 8 is a flowchart illustrating a process in which a UE in an MU-MIMO environment obtains an OCC by selecting an orthogonality allocation rule from control information transmitted by an eNodeB according to an exemplary embodiment.

FIG. 8 shows a process in which an eNodeB 809 sets a 3 bits CS parameter and transmits control information including the CS parameter to UE #1 801 belonging to the first UE group and UE #2 802 belonging to the second UE group. Each of the first and second UE groups may include one or more UEs. The description with reference to FIG. 8 is based on an assumption that each of the UE groups corresponds to one UE. In this event, the OCC value can be obtained from the CS parameter by the UEs 801 and 802 without separate signaling. The description about FIG. 8 is based on the MU-MIMO environment, which is thus limited to the inactivated sequence hopping or the sequence hopping by the unit of sub-frame. As a result, the orthogonality allocation rule is also limited to the uniform scheme.

Each of the UE #1 801 and UE #2 802 calculates $n_{PRS}(n_s)$ as in Equation 2 and $n_{DMRS}^{(1)}$ given by a higher layer as in Table 1 as cyclic shift parameter values necessary for obtaining the CS values and the base sequence $\bar{r}_{u,v}(n)$ based on a zadoff-chu sequence for the UL DM-RS sequence (step S810 or S815). The base sequence has a value changing according to the group number u, the base sequence number v within the group, and the length n of the sequence. However, UL DM-RSs occupying the same frequency bandwidth at the same slot time in the same eNodeB (or cell) have the same base sequence. As a result, the parameter actually scheduled by a higher signaling layer and transmitted through an eNodeB is CS parameter for $n_{DMRS}^{(2)}$ which determines the CS value of the UL DM-RS.

Step S810 or S815 reflects the multiple access state or the configuration of the system, and may be performed either after or in combination with various steps of FIG. 8.

The eNodeB generates a control signal, which includes DCI format 0 including a 3 bit CS parameters for value of $n_{DMRS}^{(2)}$ determined for each UE by a higher signaling layer of the system (step S816). Specifically, the higher signaling layer determines whether each of UE #1 801 or UE #2 802 to be scheduled will operate in an SU-MIMO state or an MU-MIMO state. If the UE will operate in the MU-MIMO state, the eNodeB transmits 3 bits CS parameter for value of $n_{DMRS}^{(2)}$ belonging to different CS-OCC linkage groups of Table 5 to the UEs (step S816). This may cause the CS value allocation to be performed to enable the UEs to obtain different OCC values.

Now, the transmitted 3 bits CS parameters for value of $n_{DMRS}^{(2)}$ are briefly discussed. In the case of the MU-MIMO, as the 3 bits CS parameter for value of $n_{DMRS}^{(2)}$ determined for each UE by the higher signaling layer of the system, one of the four types of values of the CS-OCC linkage group A in Table 5 is transmitted to UE #1 801 and one of the four types of values of the CS-OCC linkage group B in Table 5 is transmitted to UE #2 802. In more detail, in the case of MU-MIMO, at the time of scheduling in order to determine the CS parameter for value of $n_{DMRS}^{(2)}$ for each UE by the system higher signaling layer, the UEs may be scheduled to select CS parameter for $n_{DMRS}^{(2)}$ of different CS-OCC linkage group. That is, according to the CS-OCC linkage, the system higher signaling layer may allocate $n_{DMRS}^{(2)}$ relating to the first OCC to UE #1 801 and $n_{DMRS}^{(2)}$ relating to the second OCC to UE #2 802, so that UE #1 801 and UE #2 802 having received the CS parameter for value of $n_{DMRS}^{(2)}$ can allocate different OCCs.

Especially, two UEs having different allocated bandwidths (non-equal bandwidth resource allocation) should be scheduled to inevitably receive CS parameters for $n_{DMRS}^{(2)}$ of different CS-OCC linkage groups (in the MU-MIMO environment, two UEs having the same allocated bandwidths (equal bandwidth resource allocation) need not be scheduled to necessarily receive CS parameters for $n_{DMRS}^{(2)}$ of different CS-OCC linkage groups). In other words, if UE #1 801 is scheduled to receive one of the four CS parameter values $n_{DMRS}^{(2)}$ of CS-OCC linkage group A related to the OCC value of 0, the other UE is scheduled to receive one of the four CS parameter values $n_{DMRS}^{(2)}$ of CS-OCC linkage group B related to the OCC value of 1. For example, if UE #1 receives 0, which is one of the four CS parameter values $n_{DMRS}^{(2)}$ of CS-OCC linkage group A, for a particular layer, UE #2 receives 3, which is one of the four CS parameter values $n_{DMRS}^{(2)}$ of CS-OCC linkage group B, for the same layer. In the event, two different UEs inevitably have different OCC indexes in the MU-MIMO environment, by which they can be always discriminated from each other. For convenience of description, FIG. 8 is based on an assumption that 0 of the CS-OCC linkage group A relating to the first OCC value of 0 is transmitted as the CS parameter value $n_{DMRS}^{(2)}$ to UE #1 801, and 3 of the CS-OCC linkage group B relating to the second OCC value of 1 is transmitted as the CS parameter value $n_{DMRS}^{(2)}$ to UE #2 802.

The eNodeB 809 generates control information including 3 bits CS parameters for $n_{DMRS}^{(2)}$ differently set according to the UEs (step S816), and transmits the generated control information to the UEs 801 and 802 (steps S818 and S819). More specifically, this 3 bits parameter may be carried by the CS field of the DCI format 0.

Further, the transmission in steps S818 and S819 may be performed either sequentially or with a time interval, and the generation and transmission of the control information in step S816 may also be performed with a time interval between UE #1 and UE #2. In addition, the processes performed by UE #1 and UE #2 are independent of each other, so they are not limited by a particular sequence or simultaneous execution. Hereinafter, in spite of the independency of the two processes, they will be described together without imposing a limitation on or giving any relation between them.

Each of UE #1 801 and UE #2 802 calculates the 3 bits CS parameter for value of $n_{DMRS}^{(2)}$ from the received control information (step S820 or S825).

Thereafter, the UE calculates the CS value and the OCC value of the first layer, wherein the OCC can be obtained by calculating $n_{cs}$ and $\alpha$ from the $n_{DMRS}^{(2)}$ by using Equation 2 and then calculating the $n_{DMRS}^{OCC}$ by using the $n_{DMRS}^{(2)}$ in Table 5 (step S830 or S835). For example, if the $n_{DMRS}^{(2)}$ of UE #1 801 is 0, the $n_{DMRS}^{OCC}$ is 0 by Table 5, which may correspond to the OCC of UE #1 801 being [+1, +1]. Further, if the $n_{DMRS}^{(2)}$ of UE #2 802 is 3, the $n_{DMRS}^{OCC}$ is 1 by Table 5, which may correspond to the OCC of UE #2 802 being [+1, −1].

Therefore, if the transmitted CS parameter value $n_{DMRS}^{(2)}$ is 0, 6, 4, or 10, which correspond to the CS-OCC linkage group A in Table 5, UE #1 801 or UE #2 802 can automatically calculate the $n_{DMRS}^{OCC}$ as 0 even without receiving additional information. In contrast, if the received CS parameter value $n_{DMRS}^{(2)}$ is 3, 9, 2, or 8, which correspond to the CS-OCC linkage group B in Table 5, the $n_{DMRS}^{OCC}$ is automatically calculated as 1 without receiving additional information. In Table 5, if the $n_{DMRS}^{OCC}$ is 0, it may correspond to an OCC {+1, +1}. if the $n_{DMRS}^{OCC}$ is 1, it may correspond to an OCC {+1, −1}. The mathematical expression and values of the parameters expressing the OCC index are not limited as long as the meaning and contents thereof are not changed.

In steps S830 and S835, UE #1 801 has an OCC value of [+1, +1] and UE #2 802 has an OCC value of [+1, −1]. Before those steps, UE #1 801 and UE #2 802 have calculated the values of 0 and 3 as the $n_{DMRS}^{(2)}$.

If the CS and OCC values for the first layer have been set, each of the UE #1 801 and UE #2 802 determines if there is a layer to be additionally allocated. If there is a layer to be additionally allocated, each of the UE #1 801 and UE #2 802 calculates the CS values $\alpha$ of the layer or layers to be additionally allocated, which may include the $2^{nd}$-$N^{th}$ layers, from the CS parameter value $n_{DMRS}^{(2)}$ of the first layer (step S840 or S845).

In this event, it is possible to apply a rule (such as the CS allocation rule) for calculating the CS values $\alpha$ of a corresponding layer from the CS parameter value $n_{DMRS}^{(2)}$ of the first layer. According to the CS allocation rule, the CS values allocated to the layers are set to have distances as large as possible, so as to reduce the inter-layer interference. Equation 3 shows an example of the CS allocation rule, by which the CS values allocated to the layers are set to have distances as large as possible.

For reference, if UE #1 801 has obtained 0 as the value $n_{DMRS}^{(2)}$ and UE #2 802 has obtained 3 as the value $n_{DMRS}^{(2)}$, the $n_{DMRS}^{(2)}$ for each layer of UE #1 801 is: i) {0, 6} for each of the first and second layers in the case of rank 2; ii) {0, 4, 8} for each of the first, second, and third layers in the case of rank 3; and iii) {0, 3, 6, 9} or {0, 6, 3, 9} for each of the first, second, third, and fourth layers in the case of rank 4.

The $n_{DMRS}^{(2)}$ for each layer of UE #2 802 is: i) {3, 9} for each of the first and second layers in the case of rank 2; ii) {3, 7, 11} for each of the first, second, and third layers in the case of rank 3; and iii) {3, 6, 9, 0} or {6, 3, 9, 0} for each of the first, second, third, and fourth layers in the case of rank 4. Besides Equation 3, a scheme of setting the layers to be spaced as far as possible may be employed.

After calculating the CS value for each layer, each of UE #1 801 and UE #2 802 determines if the sequence hopping is "disabled" or a sub-frame hopping, selects the uniform scheme as the orthogonality allocation rule, and obtains the same value as the OCC value of the first layer as the OCC index values of the second to $N^{th}$ layers (step S850 or S855). As described above, the OCC of the first layer is calculated from the CS parameter for $n_{DMRS}^{(2)}$ according to the scheme shown in Table 5. Further, the OCC may also be allocated to have the orthogonality. The OCCs of the second, third, . . . layers may be allocated the same value as that of the OCC (i.e. value obtained from the $n_{DMRS}^{(2)}$) of the first layer. This can be performed by applying the orthogonality allocation rule for allocation of OCCs with the orthogonality between UEs.

In order to guarantee the maximum orthogonality between the UEs as in Equations 6 and 8 described above with reference to FIG. 7, the same $n_{DMRS}^{OCC}$ is set for the first, second, third, and fourth layers.

In steps S830 and S835, UE #1 801 has obtained an OCC value of [+1, +1] by using the OCC index of 0. Further, UE #2 802 has obtained an OCC value of [+1, −1] by using the OCC index of 1. As a result, the OCC value for each layer of UE #1 801 is: i) {0, 0} for each of the first and second layers in the case of rank 2; ii) {0, 0, 0} for each of the first, second, and third layers in the case of rank 3; and iii) {0, 0, 0, 0} for each of the first, second, third, and fourth layers in the case of rank 4.

The OCC value for each layer of UE #2 802 is: i) {1, 1} for each of the first and second layers in the case of rank 2; ii) {1, 1, 1} for each of the first, second, and third layers in the case of rank 3; and iii) {1, 1, 1, 1} for each of the first, second, third, and fourth layers in the case of rank 4.

If the calculation of the CS and OCC for the allocated layers has been completed, each of UE #1 801 and UE #2 802 generates a DM-RS sequence of each layer by applying Equation 1 to the CS value $\alpha$ determined for each layer and the base sequence for each layer, and multiplies the generated DM-RS sequence by a orthogonal sequence value (+1 or −1) in the OCC index determined for each layer, so as to generate a final DM-RS sequence (step S860 or S865). Further, the generated DM-RS sequence is mapped to a corresponding symbol of each slot by a resource element mapper (step S870 or S875). In the case of DM-RS relating to the PUSCH, the symbol corresponds to the fourth symbol among the seven symbols of each slot if a normal CP is used and corresponds to the third symbol among the seven symbols of each slot if an extended CP is used. In the case of DM-RS relating to the PUCCH, the corresponding symbol may include a maximum of three symbols in each slot, the number and locations of corresponding symbols become different depending on the type of CP and the format of PUCCH as shown in Table 3 described above. If the mapping has been completed, an SC-FDMA generator generates an SC-FDMA symbol from an RE, to which the DM-RS sequence has been mapped (step S755), and then transmits the generated DM-RS signal to the eNodeB (step S890 or 895).

FIGS. 7 and 8 show a process in which a UE determines a sequence hopping scheme and selects an orthogonality allocation rule.

Figure 9:
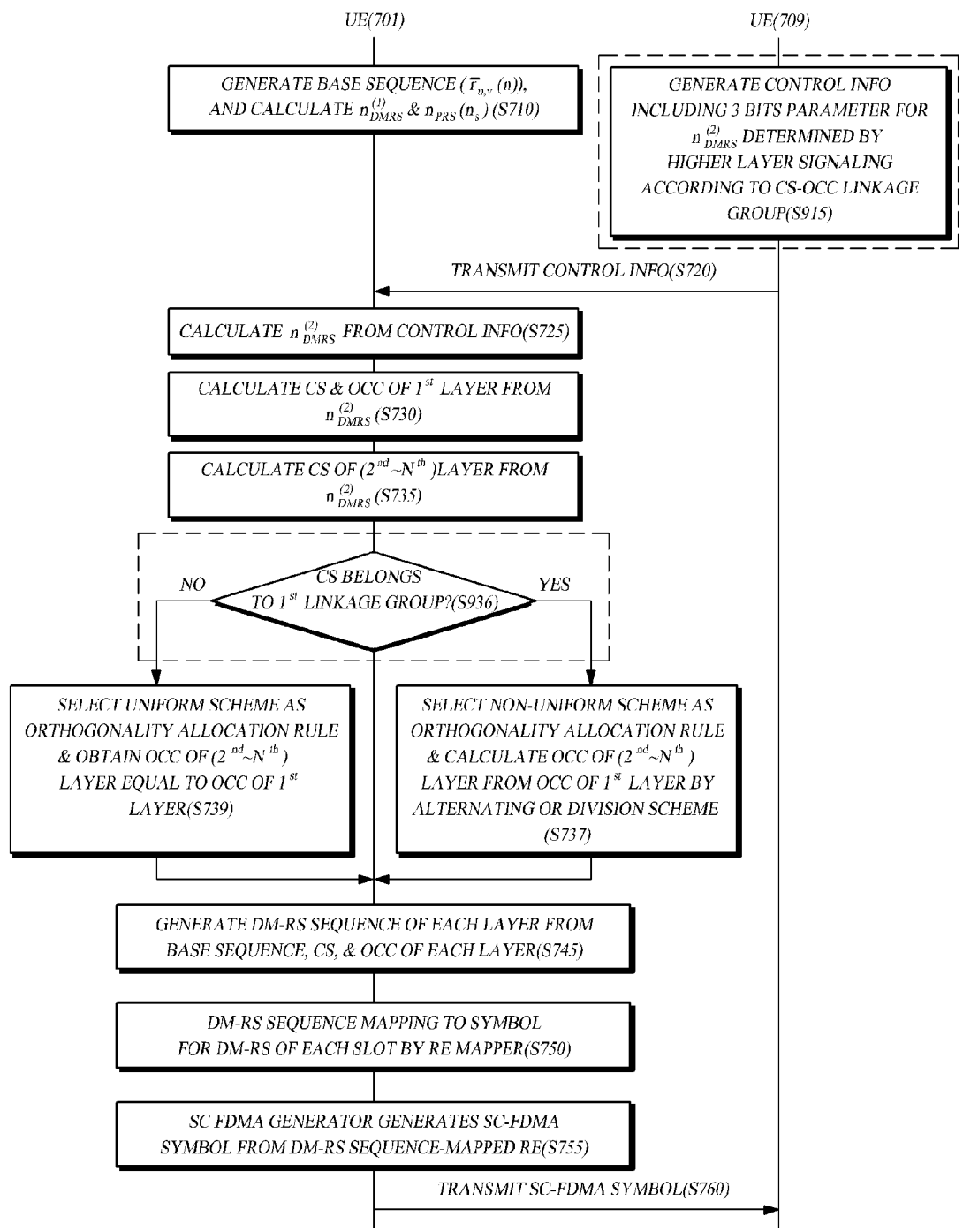
FIG. 9 is a flowchart illustrating a process in which an eNodeB implicitly provides an orthogonality allocation rule to a UE according to an exemplary embodiment.
Figure 10:
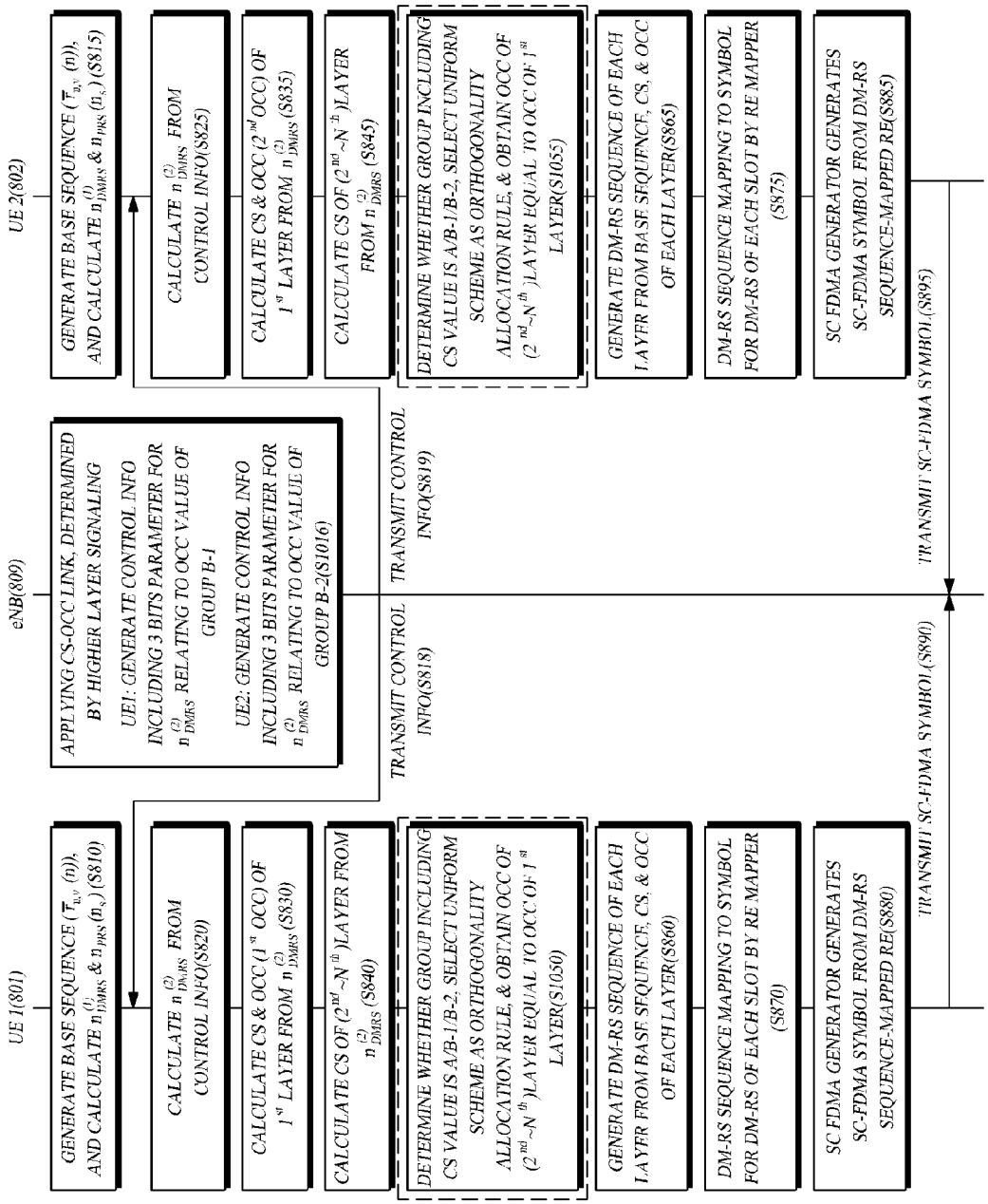
FIG. 10 is a flowchart illustrating a process in which a UE in an MU-MIMO environment calculates an OCC value by selecting an orthogonality allocation rule from control information transmitted from an eNodeB according to an exemplary embodiment.

FIGS. 9 and 10 show a process in which an eNodeB implicitly provides an orthogonality allocation rule to a UE during the process of allocating a CS value so that the UE can infer the orthogonality allocation rule.

In the process shown in FIGS. 9 and 10, the scheme presented by Table 5 is departmentalized so as to divide the CS-OCC linkage group according the SU-MIMO and the MU-MIMO and to then divide the MU-MIMO CS-OCC linkage group into two groups for two UEs. An example of the division is shown in Table 7 below. In Table 9, the linkage groups are divided into A/B (including B-1 and B-2) according to the CS parameter, and the UE can infer the OCC index for the group and can infer the orthogonality allocation rule.

TABLE 7

| CS parameter | CS parameter $n_{DMRS}^{(2)}$ | OCC index $n_{DMRS}^{OCC}$ | Orthogonality Allocation Rule |
|---|---|---|---|
| CS-OCC linkage group A | $n_{DMRS}^{(2)} \in \{0, 3, 6, 9\}$ | $n_{DMRS}^{OCC} = 0 (\to [+1, +1])$ | Non-uniform scheme |
| CS-OCC linkage group B-1 | $n_{DMRS}^{(2)} \in \{2, 4\}$ | $n_{DMRS}^{OCC} = 0 (\to [+1, +1])$ | Uniform scheme |
| CS-OCC linkage group B-2 | $n_{DMRS}^{(2)} \in \{8, 10\}$ | $n_{DMRS}^{OCC} = 1 (\to [+1, -1])$ | Uniform scheme |

In this method, different CS and OCC allocation rules are used according to the CS parameter value for the first layer. That is, the CS and OCC allocation rules become different according to whether the CS parameter value for the first layer belongs to the CS-OCC linkage group A for the SU-MIMO or the CS-OCC linkage group B-1 or B-2 for the MU-MIMO. For example, if the CS parameter value for the first layer belongs to the CS-OCC linkage group (group A of Table 7) for the SU-MIMO, the CS and OCC allocation rule as defined in Equation 9 below is applied. If the CS parameter value for the first layer belongs to the CS-OCC linkage group B-1 or B-2 for the MU-MIMO, the CS and OCC allocation rule as defined in Equation 10 below is applied.

Equation 9 shows an application in the case of the CS-OCC linkage group A.

$n_{DMRS}^{(2)}$: CS parameter of the 1$^{st}$ layer $n_{DMRS}^{(2)} \in \{0, 3, 5, 9\}$ 1) In the case of Rank 2

$\{n_{DMRS}^{(2)}$ of the 1$^{st}$ layer, $n_{DMRS}^{(2)}$ of the 2$^{nd}$ layer$\}=\{n_{DMRS}^{(2)},(n_{DMRS}^{(2)}+6) \bmod 12\}$ 2) In the case of Rank 3

$\{n_{DMRS}^{(2)}$ of the 1$^{st}$ layer, $n_{DMRS}^{(2)}$ of the 2$^{nd}$ layer, $n_{DMRS}^{(2)}$ of the 3$^{rd}$ layer$\}=\{n_{DMRS}^{(2)},(n_{DMRS}^{(2)}+4) \bmod 12,(n_{DMRS}^{(2)}+8) \bmod 12\}$ 3) In the case of Rank 4

$\{n_{DMRS}^{(2)}$ of the 1$^{st}$ layer, $n_{DMRS}^{(2)}$ of the 2$^{nd}$ layer, $n_{DMRS}^{(2)}$ of the 3$^{rd}$ layer, $n_{DMRS}^{(2)}$ of the 4$^{th}$ layer$\}=\{n_{DMRS}^{(2)},(n_{DMRS}^{(2)}+3) \bmod 12,(n_{DMRS}^{(2)}+6) \bmod 12,(n_{DMRS}^{(2)}+9) \bmod 12\}$ $n_{DMRS}^{OCC}$: OCC index of the 1$^{st}$ layer $n_{DMRS}^{OCC}=0 \to [+1, +1]$, $n_{DMRS}^{OCC}=1 \to [+1, -1]$ 1) In the case of Rank 2

$\{n_{DMRS}^{OCC}$ of the 1$^{st}$ layer, $n_{DMRS}^{OCC}$ of the 2$^{nd}$ layer$\}=\{n_{DMRS}^{OCC},1-n_{DMRS}^{OCC}\}$ 2) In the case of Rank 3

$\{n_{DMRS}^{OCC}$ of the 1$^{st}$ layer, $n_{DMRS}^{OCC}$ of the 2$^{nd}$ layer, $n_{DMRS}^{OCC}$ of the 3$^{rd}$ layer$\}=\{n_{DMRS}^{OCC},1-n_{DMRS}^{OCC},n_{DMRS}^{OCC}\}$ 3) In the case of Rank 4

$\{n_{DMRS}^{OCC}$ of the 1$^{st}$ layer, $n_{DMRS}^{OCC}$ of the 2$^{nd}$ layer, $n_{DMRS}^{OCC}$ of the 3$^{rd}$ layer, $n_{DMRS}^{OCC}$ of the 4$^{th}$ layer$\}=\{n_{DMRS}^{OCC},1-n_{DMRS}^{OCC},n_{DMRS}^{OCC},1-n_{DMRS}^{OCC}\}$ [Equation 9]

If the CS parameter value for the first layer belongs to the CS-OCC linkage group (group A of Table 7) for the SU-MIMO, the CS and OCC allocation rule of Equation 9 is applied, wherein alternating values are allocated to the OCC indexes of the layers as shown in Equation 9.

In other words, if the OCC index value of the first layer is 0, the OCC index value of the second layer is 1, the OCC index value of the third layer is 0, and the OCC index value of the fourth layer is 1. In this event, the CS parameter value for the first layer scheduled and signaled by the higher signaling layer is one of the four types of values belonging to the group for the SU-MIMO among the CS and OCC linkage groups in shown in Table 9 described above.

Equation 10 below shows an application in the case of the CS-OCC linkage group B-1 or B-2.

$n_{DMRS}^{(2)}$: CS parameter of the 1$^{st}$ layer, $n_{DMRS}^{(2)} \in \{2, 4, 8, 10\}$ $n_{DMRS}^{(2)}$ of the 1$^{st}$ layer for UE A $\in \{2, 4\}$ $n_{DMRS}^{(2)}$ of the 1$^{st}$ layer for UE B $\in \{8, 10\}$ 1) In the case of Rank 2

$\{n_{DMRS}^{(2)}$ of the 1$^{st}$ layer, $n_{DMRS}^{(2)}$ of the 2$^{nd}$ layer$\}=\{n_{DMRS}^{(2)},(n_{DMRS}^{(2)}+6) \bmod 12\}$ 2) In the case of Rank 3

$\{n_{DMRS}^{(2)}$ of the 1$^{st}$ layer, $n_{DMRS}^{(2)}$ of the 2$^{nd}$ layer, $n_{DMRS}^{(2)}$ of the 3$^{rd}$ layer$\}=\{n_{DMRS}^{(2)},(n_{DMRS}^{(2)}+4) \bmod 12,(n_{DMRS}^{(2)}+8) \bmod 12\}$ 3) In the case of Rank 4

$\{n_{DMRS}^{(2)}$ of the 1$^{st}$ layer, $n_{DMRS}^{(2)}$ of the 2$^{nd}$ layer, $n_{DMRS}^{(2)}$ of the 3$^{rd}$ layer, $n_{DMRS}^{(2)}$ of the 4$^{th}$ layer$\}=\{n_{DMRS}^{(2)},(n_{DMRS}^{(2)}+3) \bmod 12,(n_{DMRS}^{(2)}+6) \bmod 12,(n_{DMRS}^{(2)}+9) \bmod 12\}$ $n_{DMRS}^{OCC}$: OCC index of the 1$^{st}$ layer $n_{DMRS}^{OCC}=0 \to [+1, +1]$, $n_{DMRS}^{OCC}=1 \to [+1, -1]$ 1) In the case of Rank 2

$\{n_{DMRS}^{OCC}$ of the 1$^{st}$ layer, $n_{DMRS}^{OCC}$ of the 2$^{nd}$ layer$\}=\{n_{DMRS}^{OCC},n_{DMRS}^{OCC}\}$ 2) In the case of Rank 3

$\{n_{DMRS}^{OCC}$ of the 1$^{st}$ layer, $n_{DMRS}^{OCC}$ of the 2$^{nd}$ layer, $n_{DMRS}^{OCC}$ of the 3$^{rd}$ layer$\}=\{n_{DMRS}^{OCC},n_{DMRS}^{OCC},n_{DMRS}^{OCC}\}$ 3) In the case of Rank 4

$\{n_{DMRS}^{OCC}$ of the 1$^{st}$ layer, $n_{DMRS}^{OCC}$ of the 2$^{nd}$ layer, $n_{DMRS}^{OCC}$ of the 3$^{rd}$ layer, $n_{DMRS}^{OCC}$ of the 4$^{th}$ layer$\}=\{n_{DMRS}^{OCC},n_{DMRS}^{OCC},n_{DMRS}^{OCC},n_{DMRS}^{OCC}\}$ [Equation 10]

If the CS parameter value for the first layer belongs to the CS-OCC linkage group (group B of Table 7) for the MU-MIMO, the layers are allocated the same OCC index while the UEs are allocated different OCC indexes as in Equation 10 for discrimination between the UEs in the MU-MIMO. Thus, if UE #1 has an OCC index of 0 while UE #2 has an OCC index of 1 in the MU-MIMO environment, UE #1 should have the OCC index of 0 for all the layers and UE #2 should have the OCC index of 1 for all the layers.

In this event, the higher signaling layer schedules and transmits a 3 bits CS parameter for value of $n_{DMRS}^{(2)}$ in consideration of two groups (group B-1 or B-2) within the CS-OCC linkage group (group B of Table 7) for the MU-MIMO as shown in Table 7 described above. Thus, in the case of MU-MIMO, at the time of scheduling in order to determine the CS parameter value $n_{DMRS}^{(2)}$ for each UE by the higher layer signaling, UEs may be scheduled to select CS parameters for $n_{DMRS}^{(2)}$ of different CS-OCC linkage groups within the CS-OCC linkage group (group B of Table 7) for the MU-MIMO. Especially, two UEs having different allocated bandwidths (or non-equal bandwidth resource allocation) should be scheduled to inevitably receive CS parameters for $n_{DMRS}^{(2)}$ of different CS-OCC linkage groups (in the MU-MIMO environment, two UEs having the same allocated bandwidths (or equal bandwidth resource allocation) may not be scheduled to receive CS parameters for $n_{DMRS}^{(2)}$ of different CS-OCC linkage groups). In other words, if one UE is scheduled to receive one of the two CS parameter values $n_{DMRS}^{(2)}$ of one CS-OCC linkage group B-1 among the two CS-OCC linkage groups (group B in Table 9), the other UE is scheduled to receive one of the two CS parameter values $n_{DMRS}^{(2)}$ of the CS-OCC linkage group B-2. For example, if UE #1 receives 4, which is one of the two CS parameter values $n_{DMRS}^{(2)}$ at CS-OCC linkage group B-1, for the first layer, UE #2 receives 8, which is one of the two CS parameter values $n_{DMRS}^{(2)}$ at CS-OCC linkage group B-2, for the same layer. In the event, two different UEs inevitably have different OCC indexes in the MU-MIMO environment, by which they can be always discriminated from each other.

Equation 9 may be modified into Equation 11, wherein the same OCC index value is allocated to the first two layers while another value is allocated to the other two layers. That is, Equation 9 corresponds to the alternating scheme among the non-uniform scheme, while Equation 11 corresponds to the division scheme among the non-uniform scheme in the orthogonality allocation rule. In relation with Equation 11, Equation 10 may be modified into Equation 12 below.

$n_{DMRS}^{(2)}$: CS parameter of the 1$^{st}$ layer $n_{DMRS}^{(2)} \in \{0, 3, 6, 9\}$ 1) In the case of Rank 2

$\{n_{DMRS}^{(2)}$ of the 1$^{st}$ layer,$n_{DMRS}^{(2)}$ of the 2$^{nd}$ layer$\} = \{n_{DMRS}^{(2)},(n_{DMRS}^{(2)}+6) \bmod 12\}$ 2) In the case of Rank 3

$\{n_{DMRS}^{(2)}$ of the 1$^{st}$ layer,$n_{DMRS}^{(2)}$ of the 2$^{nd}$ layer, $n_{DMRS}^{(2)}$ of the 3$^{rd}$ layer$\} = \{n_{DMRS}^{(2)}, (n_{DMRS}^{(2)}+4) \bmod 12,(n_{DMRS}^{(2)}+8)\bmod 12\}$ 3) In the case of Rank 4

$\{n_{DMRS}^{(2)}$ of the 1$^{st}$ layer,$n_{DMRS}^{(2)}$ of the 2$^{nd}$ layer, $n_{DMRS}^{(2)}$ of the 3$^{rd}$ layer,$n_{DMRS}^{(2)}$ of the 4$^{th}$ layer$\} = \{n_{DMRS}^{(2)},(n_{DMRS}^{(2)}+6)\bmod 12, (n_{DMRS}^{(2)}+3) \bmod 12,(n_{DMRS}^{(2)}+9) \bmod 12\}$ $n_{DMRS}^{OCC}$: OCC index of the 1$^{st}$ layer $n_{DMRS}^{OCC}=0 \rightarrow [+1, +1]$, $n_{DMRS}^{OCC}=1 \rightarrow [+1, -1]$ 1) In the case of Rank 2

$\{n_{DMRS}^{OCC}$ of the 1$^{st}$ layer,$n_{DMRS}^{OCC}$ of the 2$^{nd}$ layer$\} = \{n_{DMRS}^{OCC},n_{DMRS}^{OCC}\}$ 2) In the case of Rank 3

$\{n_{DMRS}^{OCC}$ of the 1$^{st}$ layer,$n_{DMRS}^{OCC}$ of the 2$^{nd}$ layer, $n_{DMRS}^{OCC}$ of the 3$^{rd}$ layer$\} = \{n_{DMRS}^{OCC},n_{DMRS}^{OCC},n_{DMRS}^{OCC}\}$ 3) In the case of Rank 4

$\{n_{DMRS}^{OCC}$ of the 1$^{st}$ layer,$n_{DMRS}^{OCC}$ of the 2$^{nd}$ layer, $n_{DMRS}^{OCC}$ of the 3$^{rd}$ layer,$n_{DMRS}^{OCC}$ of the 4$^{th}$ layer$\} = \{n_{DMRS}^{OCC},n_{DMRS}^{OCC},n_{DMRS}^{OCC},n_{DMRS}^{OCC}\}$ [Equation 12]

The process of determining the linkage group to which the CS parameter belongs is nearly similar to the processes shown in FIGS. 7 and 8.

FIG. 9 is a flowchart illustrating a process in which an eNodeB implicitly provides an orthogonality allocation rule to a UE according to an exemplary embodiment.

In FIG. 9, steps S915 and S936 are different from corresponding steps of FIG. 7 while the other steps S710, S720, S725, S730, S735, S737, S739, S745, S750, S755, and S760 are similar to corresponding steps of FIG. 9.

The eNodeB 709 generates a control signal, which includes DCI format 0 including a 3 bits CS parameter for $n_{DMRS}^{(2)}$ determined for each UE by a higher signaling layer of the system, by referring to the linkage group presented in Table 7 (step S915). Specifically, a higher signaling layer of the system determines whether each UE to be scheduled will operate in an SU-MIMO (including the equal sized Resource allocation type MU-MIMO) state or an MU-MIMO (including the non-equal sized Resource allocation type MU-MIMO) state. If the UE will operate in the SU-MIMO (including the equal sized Resource allocation type MU-MIMO) state, the eNodeB transmits a 3 bits CS parameter for $n_{DMRS}^{(2)}$ included in the CS-OCC linkage group A of Table 7 (step S915). On the other hand, in the case of the MU-MIMO, from among the linkage groups shown in Table 7 for each UE, a CS parameter value of group B-1 is transmitted to one UE while a CS parameter value of group B-2 is transmitted to the other UE. Thereafter, the process of receiving the CS parameter and inferring an OCC value by the UE is the same as that in FIG. 7.

Further, the UE determines the group to which the CS parameter belongs, from the OCC value. In the case of a CS value included in group A (the first linkage group) from among the linkage groups shown in Table 7, an orthogonality allocation rule of an allocating scheme or a division scheme, which corresponds to the non-uniform scheme of the orthogonality allocation rule for discriminating the layers, is applied to set the CS parameter values of the other layers (step S737).

In the case of a CS value included in group B shown in Table 9, the uniform scheme, which is an orthogonality allocation rule for discriminating UEs other than layers, is applied as the orthogonality allocation rule, so that the same value as the OCC value of the first layer is obtained as the OCC values of the other layers (step S739). Thereafter, the process of generating a reference signal sequence by applying the CS value and the OCC to the layers and transmitting the RS sequence to the eNodeB is the same as steps S745, S750, S755, and S760 in FIG. 7, so a detailed description of the same steps will be omitted here.

FIG. 10 is a flowchart illustrating a process in which a UE in an MU-MIMO environment calculates an OCC value by selecting an orthogonality allocation rule from control information transmitted from an eNodeB according to an exemplary embodiment.

FIG. 10 shows a process of selecting a CS parameter in linkage group B-1 and B-2 used in the case of MU-MIMO among the linkage groups shown in Table 7.

allocation rule and sets the same OCC value for the other layers (steps S1050 and S1055). As a result, each of UE #1 801 and UE #2 802 can have different OCC values, through which they can be identified.

Thereafter, the process of generating a reference signal sequence by applying the CS value and the OCC to the layers and transmitting the RS sequence to the eNodeB is similar to the steps S860 to S895 in FIG. 8.

Table 8 shows an example of CS parameter values and OCC indexes selected according to an orthogonality allocation rule proper for the SU-MIMO environment or MU-MIMO environment without separate signaling in a state in which the UE cannot determine whether the UE is in the SU-MIMO state or MU-MIMO state, as shown in FIGS. 7 to 10.

TABLE 8

| | UL DM-RS | | $1^{st}$ layer | $2^{nd}$ layer | $3^{rd}$ layer | $4^{th}$ layer |
|---|---|---|---|---|---|---|
| SU-MIMO | Case 1-2 Rank, 1 UE | UE A $n_{DMRS}^{(2)}$ | 0 | 6 | | |
| | | $n_{DMRS}^{OCC}$ | [+1, +1] | [+1, −1] | | |
| | Case 2-3 Rank, 1 UE | UE A $n_{DMRS}^{(2)}$ | 0 | 4 | 8 | |
| | | $n_{DMRS}^{OCC}$ | [+1, +1] | [+1, −1] | [+1, +1] | |
| | Case 3-4 Rank, 1 UE | UE A $n_{DMRS}^{(2)}$ | 0 | 3 | 6 | 9 |
| | | $n_{DMRS}^{OCC}$ | [+1, +1] | [+1, −1] | [+1, +1] | [+1, −1] |
| MU-MIMO | Case 4-4 Rank per UE, 2 UEs | UE A $n_{DMRS}^{(2)}$ | 4 | 7 | 10 | 1 |
| | | $n_{DMRS}^{OCC}$ | [+1, +1] | [+1, +1] | [+1, +1] | [+1, +1] |
| | | UE B $n_{DMRS}^{(2)}$ | 8 | 11 | 2 | 5 |
| | | $n_{DMRS}^{OCC}$ | [+1, −1] | [+1, −1] | [+1, −1] | [+1, −1] |

In FIG. 10, steps S1015, S1050, and S1055 are different from corresponding steps of FIG. 8 while the other steps are similar to the corresponding steps of FIG. 8.

In the process shown in FIG. 10, the eNodeB 809 sets a 3 bits CS parameter and transmits control information including the CS parameter to UE #1 801 belonging to the first UE group and UE #2 802 belonging to the second UE group. Each of the first and second UE groups may include one or more UEs. The description with reference to FIG. 10 is based on an assumption that each of the UE groups corresponds to one UE. In this event, the OCC value can be obtained from the CS parameter by the UEs 801 and 802 without separate signaling. Further, the UE can discriminate the orthogonality allocation rule through the sequence hopping. The description about FIG. 10 is based on the MU-MIMO environment, which is thus limited to the linkage group B-1/B-2. As a result, the orthogonality allocation rule may be limited to the uniform scheme.

The eNodeB 809 generates a control signal, which includes DCI format 0 including a 3 bits CS parameter for $n_{DMRS}^{(2)}$ determined for each UE by a higher signaling layer of the system (step S1016). Specifically, the higher signaling layer determines whether each UE to be scheduled will operate in an SU-MIMO state or an MU-MIMO state. If the UE will operate in the MU-MIMO state, the eNodeB 809 transmits CS parameter for $n_{DMRS}^{(2)}$ belonging to different CS-OCC linkage groups (groups B-1 and B-2 of Table 9) to the UEs (step S1016). Thus, the CS value allocation is performed to enable the UEs to obtain different OCC values.

After steps S818 to S845, each of UE #1 and UE #2 may obtain the OCC value from the received CS value based on the linkage group as shown in Table 9. Further, they determine whether the linkage group for calculation of the OCC value is group A, B-1, or B-2. If the group is group B-1 or B-2, each of the UEs employs the uniform scheme as the orthogonality In the case of MU-MIMO, UE A has [+1, +1], which is the same OCC for all the layers, and UE B has [+1, −1], which is the same OCC for all the layers.

Figure 11:
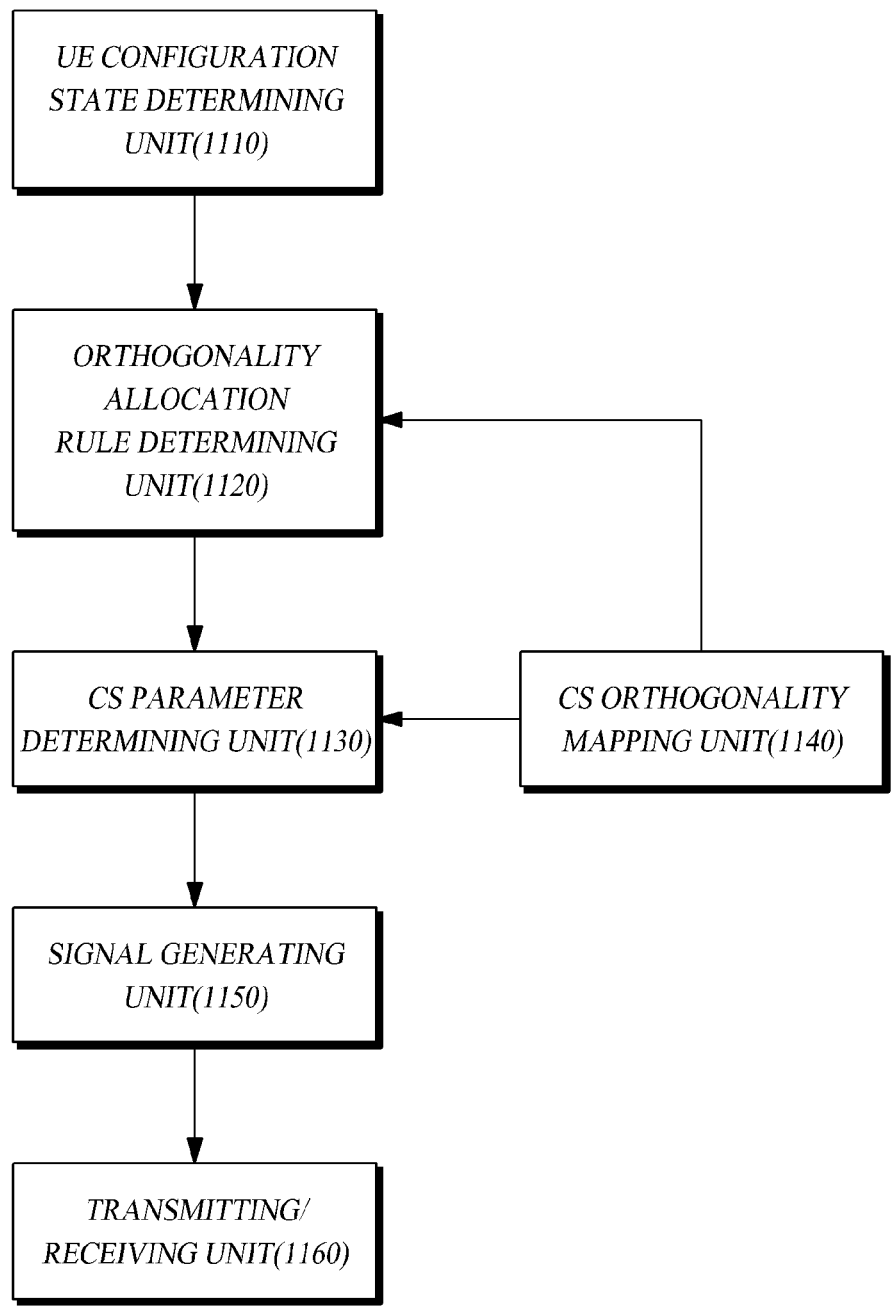
FIG. 11 is a block diagram of an apparatus for transmitting a CS parameter indicating the orthogonality according to an exemplary embodiment.

FIG. 11 is a block diagram of an apparatus for transmitting a CS parameter which indicate information relating to the orthogonality according to an exemplary embodiment.

The apparatus shown in FIG. 11 may be an eNodeB.

The apparatus or eNodeB shown in FIG. 11 includes a UE configuration state determining unit 1110, an orthogonality allocation rule determining unit 1120, a CS parameter determining unit 1130, a signal generating unit 1150, and a Transmitting/Receiving unit 1160. The apparatus may further include a CS orthogonality mapping unit 1140.

The UE configuration state determining unit 1110 determines the multiple access state of one or more UEs. Thus, the UE configuration state determining unit 1110 determines whether a UE operates in an SU-MIMO state or an MU-MIMO state.

The orthogonality allocation rule determining unit 1120 determines an orthogonality allocation rule according to the determined multiple access state of the UE. The orthogonality allocation rule determining unit 1120 may determine the orthogonality allocation rule to be selected according to the hopping scheme for the reference signal sequence, and thus determine the orthogonality allocation rule selected based on the hopping scheme determined by the UE. Further, the orthogonality allocation rule determining unit 1120 may determine the orthogonality allocation rule which the UE may obtain from the CS parameter value as in the embodiment shown in Table 7.

The CS parameter determining unit 1130 determines a CS parameter, by which it is possible to calculate the determined orthogonality allocation rule and orthogonality-related information according to the determined multiple access state of the UE.

The signal generating unit 1150 generates a signal for transmitting control information including the determined CS parameter, and the Transmitting/Receiving unit 1160 transmits the signal to the UE.

The CS parameter determining unit 1130 may determine a cyclic shift parameter, by which it is possible to calculate the determined orthogonality allocation rule and orthogonality-related information according to the determined multiple access state of the UE.

By applying the embodiment shown in FIGS. 7 and 8, the UE can identify the orthogonality allocation rule through the sequence hopping scheme. If the multiple access state of the UE is the SU-MIMO state, the UE configuration state determining unit 1110 may select a CS from all the CSs that may be allocated. This case includes the example described above with reference to FIG. 7. If the UE configuration state determining unit 1110 has determined that the multiple access sate of the UE is the MU-MIMO state and the UEs include a first UE and a second UE, CS parameters included in different groups may be selected to obtain different orthogonality-related indicators in allocation of the CS parameters as shown in FIG. 8.

The UE configuration state determining unit 1110 may determine the first CS parameter to be received by the first UE and the second CS parameter to be received by the second UE, and make first information relating to the orthogonality calculated from the first CS parameter be different from second information relating to the orthogonality calculated from the second CS parameter.

In the case of applying the embodiment shown in FIGS. 9 and 10, the UE can identify the orthogonality-related information and the orthogonality allocation rule by using linkage group as shown in Table 7. If the multiple access state of the UE is the SU-MIMO state, the UE configuration state determining unit 1110 may select a CS parameter from among all CS parameters that may be allocated to the UE in the SU-MIMO state, such as group A of Table 7. This case includes the example described above with reference to FIG. 9. If the UE configuration state determining unit 1110 has determined that the multiple access sate of the UE is the MU-MIMO state and the UEs include a first UE and a second UE, CS parameters included in different groups, such as groups B-1 and B-2 of Table 7, may be selected to enable the UE to obtain different orthogonality-related indicators in allocation of the CS parameters as shown in FIG. 10 and select an orthogonality allocation rule different from that of group A.

Referring to FIG. 11, the CS parameter may indicate CS parameter value $n_{DMRS}^{(2)}$, and orthogonality-related information may include an OCC index. Therefore, CS-OCC linkage groups as shown in Table 5 and Table 7 may be used. This information may be stored in the CS orthogonality mapping unit 1140. Specifically, the CS orthogonality mapping unit 1140 divides all CS parameters allocable to the UE into a first set and a second set as shown in Table 5 or into a $1^{st}$ set, a $2\text{-}1^{st}$ set, and a $2\text{-}2^{nd}$ set as shown in Table 7, wherein each of intersections of the sets is an empty set, so as to make it possible to obtain the orthogonality-related information through the CS parameter. Of course, as in Table 7, it is possible to obtain the orthogonality allocation rule.

If the bandwidth allocated to the first UE is different from the bandwidth allocated to the second UE, the CS parameters may be set to have different OCC indexes.

Further, the signal generating unit 1150 generates a signal for transmitting control information including the determined CS parameter to the UE. The control information may be DCI format 0 included in a PDCCH. Further, the Transmitting/Receiving unit 1160 transmits the generated signal to the UE.

The apparatus shown in FIG. 11 includes CS parameter for $n_{DMRS}^{(2)}$ DMRS in the DCI format 0 for transmission, so that each UE not only can obtain orthogonal OCC index but can also determine the scheme for allocating the OCC index to each layer, from the CS parameter for $n_{DMRS}^{(2)}$. Therefore, as in the embodiments shown in FIGS. 7 and 8, values that can be set as the CS parameter for $n_{DMRS}^{(2)}$ are divided into two groups, and an OCC index of 0 is allocated to the CS parameter for $n_{DMRS}^{(2)}$ of one group while an OCC index of 1 is allocated to the CS parameter for $n_{DMRS}^{(2)}$ of the other group. Further, as in the embodiments shown in FIGS. 9 and 10, those values may be divided into three groups, so as to allow selection of an orthogonality allocation rule. As a result, even without separate transmission of the OCC index and the orthogonality allocation rule, the UE can obtain the OCC index from the received CS parameter for $n_{DMRS}^{(2)}$ and can generate a reference signal, such as DM-RS, by calculating the CS and the OCC for each layer by applying the orthogonality allocation rule.

Further, the CS parameter may be transmitted through signaling of a physical layer (L1), such as PDCCH, signaling of a wireless access layer or Medium Access Control (MAC) layer (L2), a Radio Resource Control (RRC) signaling, or L3 signaling such as a message. However, the present invention is not limited to such signaling, and the OCC index may be set to have three or more values beyond 0 and 1.

According to the embodiments of the present invention described above, in transmitting a reference signal, such as an uplink DM-RS, in consideration of each eNodeB (or cell) or each UE in a new environment, such as MU-MIMO or CoMP environment, and increasing antennas in the LTE-A, it is possible to increase the number of orthogonal resources to be orthogonally multiplexed and thus possible to satisfy the orthogonality by transmitting the parameter value for setting the CS value ($\alpha$) of the DM-RS without change, without separately transmitting orthogonality-related information. Therefore, it is possible to use the basic CS parameters of the existing LTE while maintaining the backward compatibility. Especially, since the OCC have different functions according to whether the UE is in the SU-MIMO state or the MU-MIMO state, the OCC may be allocated in accordance with the access environment of each network, which can guarantee the orthogonality between reference signal sequences and reduce the interference between them.

Figure 12:
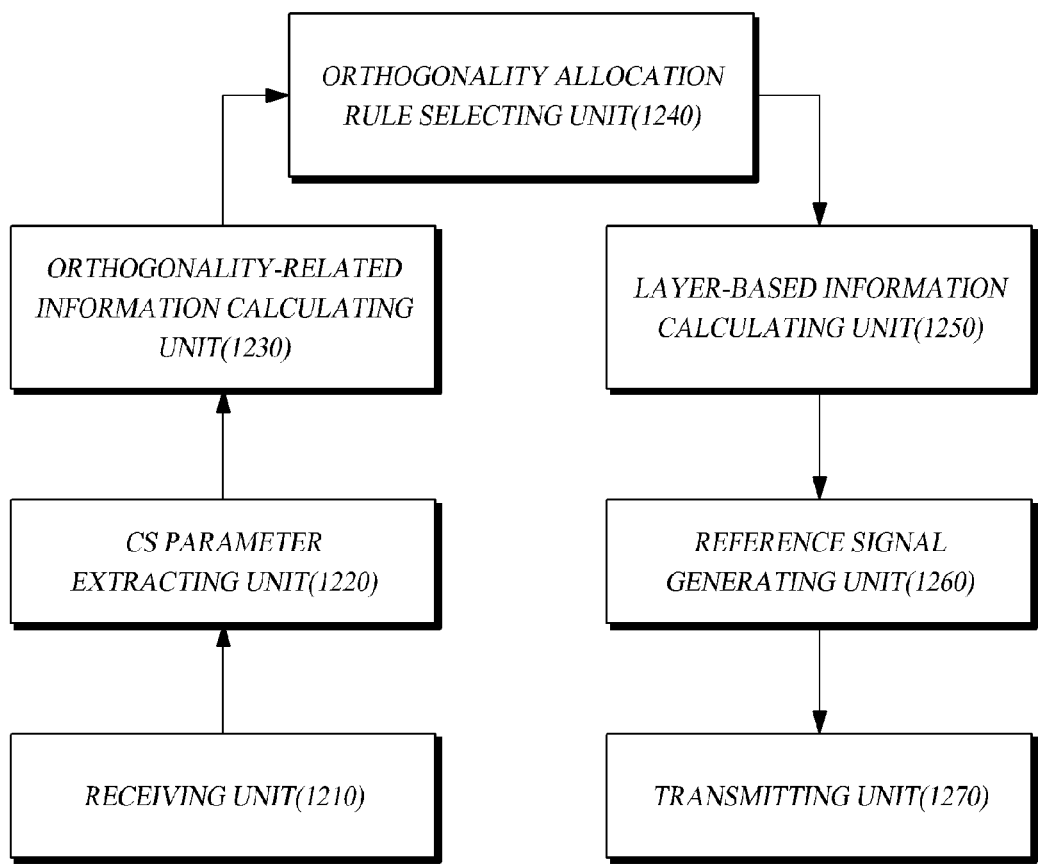
FIG. 12 is a block diagram of an apparatus for receiving a CS parameter indicating the orthogonality and transmitting a reference signal satisfying the orthogonality according to an exemplary embodiment.

FIG. 12 is a block diagram of an apparatus for receiving a CS parameter which indicate information relating to the orthogonality and transmitting a reference signal generated with the information relating to the orthogonality according to an exemplary embodiment.

The apparatus shown in FIG. 12 may be a UE.

The apparatus or UE shown in FIG. 12 includes a receiving unit 1210, a CS parameter extracting unit 1220, an orthogonality-related information calculating unit 1230, an orthogonality allocation rule selecting unit 1240, a layer-based information calculating unit 1250, a reference signal generating unit 1260, and a transmitting unit 1270.

The receiving unit 1210 receives control information from an eNodeB or may receive a wireless signal including control information from the eNodeB. The control information may be carried by a PDCCH.

The CS parameter extracting unit 1220 extracts a CS parameter for a first layer from the control signal received by the receiving unit 1210. If the control information is carried by the PDCCH, the CS parameter for $n_{DMRS}^{(2)}$ may be included as a CS parameter in the DCI format 0.

The orthogonality-related information calculating unit 1230 calculates the orthogonality-related information for the first layer from the CS parameter for the first layer. This information may be calculated by using a mapping relation or a predetermined function relating to the CS parameter for the first layer. The orthogonality-related information for the first layer may be an OCC index indicating an OCC.

For example, if the received CS parameter for the first layer belongs to a particular CS parameter group, such as CS-OCC linkage group, the orthogonality-related information can be calculated from an OCC index relating to the particular CS parameter group. Therefore, if one OCC is mapped to one CS parameter group including multiple CS parameters, the OCC can be calculated from all the CS parameters included in the group, as described above in relation to the CS-OCC linkage group shown in Table 5 or 9.

The orthogonality allocation rule selecting unit 1240 selects an orthogonality allocation rule to be used for calculation of orthogonality-related information of the other layers. Specifically, as shown in FIGS. 7 and 8, if a determined current hopping sequence corresponds to a hopping scheme by the unit of slot, the orthogonality allocation rule selecting unit 1240 selects an orthogonality allocation rule, which indicates application of the alternating scheme or the division scheme to the other layers so as to obtain orthogonality-related information from the orthogonality-related information of the first layer. Further, if current hopping sequence does not correspond to the hopping scheme by the unit of slot, the orthogonality allocation rule selecting unit 1240 may select an orthogonality allocation rule, which indicates application of the uniform scheme to the other layers in order to obtain the orthogonality-related information.

The orthogonality allocation rule may be selected by determining the group to which the CS parameter value belongs, by referring to FIGS. 9 and 10 and Table 7.

The layer-based information calculating unit 1250 calculates a CS parameter for a $K^{th}$ layer from the CS parameter for the first layer, and obtains orthogonality-related information for the $K^{th}$ layer by applying the selected orthogonality allocation rule to the orthogonality-related information for the first layer, wherein N indicates the number of all layers allocated to each UE, K is a number to indicate the $K^{th}$ layer among a total of N layers, and N is a natural number equal to or larger than 1.

That is, CS parameters for the other layers from the second layer may be calculated in order to reduce the interference according to the number of layers used by the UE. Further, the orthogonality-related information may also be calculated for each layer based on the first layer.

After the information necessary for generation of the reference signals is obtained, the reference signal generating unit 1260 generates a reference signal, an example of which is a DM-RS. More specifically, the reference signal generating unit 1260 generates a reference signal for the first layer by using orthogonality-related information for the first layer and a CS parameter for the first layer, and generates a reference signal for the $K^{th}$ layer by using orthogonality-related information for the $K^{th}$ layer and a CS parameter for the $K^{th}$ layer, in which N indicates the number of all layers allocated to each UE, K is a number to indicate the $K^{th}$ layer among a total of N layers, and N is a natural number equal to or larger than 1.

According to an embodiment of the present invention, the reference signal may be calculated from the base sequence, OCC, CS for each layer, etc. as in Equations 1 and 2.

The reference signal generating unit 1260 calculates CS α by applying the received CS parameters $n_{DMRS}^{(2)}$, $n_{DMRS}^{(1)}$, and $n_{PRS}(n_s)$ for each layer to Equation 2, calculates the base sequence $\bar{r}_{u,v}(n)$, and generates a DM-RS sequence of each layer by using Equation 1. Then, the reference signal generating unit 1260 multiplies the generated DM-RS sequence by a orthogonal sequence value (+1 or −1) in the OCC index determined for each layer, so as to generate a final DM-RS sequence. Then, the generated DM-RS sequence is mapped to a corresponding symbol of each slot by an RE mapping unit. If the mapping has been completed, an SC-FDMA generating unit generates an SC-FDMA symbol from an RE, to which the DM-RS sequence has been mapped.

Therefore, the reference signal generating unit 1260 either may be independently implemented or may be implemented together with a Scrambler, a modulation mapping unit), a transform precoder, a resource element mapping unit, and an Single-Carrier FDMA (SC-FDMA) signal generating unit, which are elements of a conventional UE.

The generated reference signal is transmitted to an eNodeB by the transmitting unit 1270.

If the UE is in the SU-MIMO state, the construction shown in FIG. 12 can generate a UL DM-RS from the OCC value and CS parameter, so as to reduce the inter-layer interference as much as possible. Further, even if the UE is in the MU-MIMO state, the construction can generate a UL DM-RS from the OCC value and CS parameter, so as to reduce the inter-layer interference and the inter-UE interference as much as possible. Since the CS parameter provides an orthogonality allocation rule and information on the OCC for maintaining the orthogonality to UEs, it is possible to guarantee the orthogonality for a UE in the SU-MIMO environment through different OCCs between layers of the UE and to guarantee the orthogonality for a UE in the MU-MIMO environment through different OCCs between UEs. Further, since separate signaling is not given to the UEs, the compatibility condition is also satisfied.

The reference signal generating unit 1260 described above may be implemented either within or in cooperation with an SC-FDMA signal generating unit.

Further, the apparatus according to the embodiments shown in FIGS. 7, 8, 9, and 10 may additionally include an antenna number determining unit for determining the number of antennas (or the number of necessary transmission layers) beyond the configuration shown in FIG. 12. In this event, the reference signal generating unit 1260 may generate a DM-RS sequence for each antenna (or layer).

The present disclosure provides a method and an apparatus for allocating an OCC and a CS value in each layer of a UL DM-RS. If a CS parameter for the first layer scheduled and determined by a higher signaling layer is given (i.e. signaled) to the UE through an eNodeB, the apparatus can allocate an OCC of each layer according to a predetermined orthogonality allocation rule and a CS value of another layer based on the given or signaled value. Especially, according to whether the access state of the UE is the SU-MIMO state or the MU-MIMO state, the method and apparatus use different CS values and OCC values and apply different orthogonality allocation rules for OCC allocation to each layer. The OCC identifies each layer in the SU-MIMO state and identifies each UE in the MU-MIMO environment. Moreover, the orthogonality allocation rule enables UL DM-RS transmission for multiple layers in the LTE-A system, etc. without additional signaling of additional information.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of an eNodeB apparatus including a processor for transmitting a Cyclic Shift (CS) parameter, the method comprising:
   determining, with a processor, the CS parameter which implicitly indicates an orthogonality allocation rule and orthogonality-related information, by determining a multiple access state of a User Equipment (UE); and
   transmitting the determined CS parameter to the UE,
   wherein the orthogonality-related information comprises an Orthogonal Cover Code (OCC) indicated by the CS parameter,
   the orthogonality allocation rule is determined as a uniform scheme or a non-uniform scheme according to the CS parameter,
   determining the CS parameter by which the non-uniform scheme is applied if the UE is in an SU-MIMO (Single User Multiple Input Multiple Output) state,
   determining the CS parameter by which the uniform scheme is applied if the UE is in an MU-MIMO (Multiple User Multiple Input Multiple Output) state.

2. The method of claim 1, further comprising:
   determining CS parameters for a first UE and a second UE, which are in an MU-MIMO state,
   wherein determining the CS parameters for the first UE and the second UE comprises:
   determining a first CS parameter to be received by the first UE; and
   determining a second CS parameter to be received by the second UE,
   wherein first orthogonality-related information indicated by the first CS parameter is different from second orthogonality-related information indicated by the second CS parameter.

3. The method of claim 2, wherein a bandwidth allocated to the first UE is different from a bandwidth allocated to the second UE.

4. The method of claim 1, wherein the uniform scheme is a scheme of allocating an equal OCC to all layers of the UE, and the non-uniform scheme is a scheme of allocating a first OCC to a first layer and a second layer and allocating a second OCC to a third layer and a fourth layer or allocating the second OCC to a first layer and a second layer and allocating the first OCC to a third layer and a fourth layer.

5. A method of an eNodeB apparatus including a processor for transmitting a Cyclic Shift (CS) parameter to a User Equipment (UE), which generates and transmits reference signals for N layers (N is an integer), the method comprising:
   determining, with a processor, the CS parameter which implicitly indicates an Orthogonal Cover Code (OCC) used for generation of a reference signal for each layer; and
   transmitting the determined CS parameter to the UE,
   wherein the CS parameter is an element of a first set or a second set, an intersection between the first set and the second set is an empty set, and
   one element of the first set is determined as the CS parameter if a first OCC is identically allocated to a first layer and a second layer, and a second OCC different from the first OCC is identically allocated to a third layer and a fourth layer, and
   one element of the second set is determined as the CS parameter if one OCC is identically allocated to all the N layers.

6. The method of claim 5, wherein the CS parameter is expressed by 3 bits of information, which is 000, 001, 010, 011, 100, 101, 110, or 111 indicating that the CS parameter value of the first layer is 0, 6, 3, 4, 2, 8, 10, or 9, respectively, and
   CS parameters, which are elements of the first set, are expressed as 000, 001, 010, and 111 indicating that the CS parameter values of the first layer are 0, 6, 3, and 9, respectively, while CS parameters, which are elements of the second set, are expressed as 011, 100, 101, and 110 indicating that the CS parameter values of the first layer are 4, 2, 8, and 10, respectively.

7. The method of claim 6, wherein, among the CS parameters that are elements of the second set,
   one of 011 and 100 indicating that the CS parameter values of the first layer are 4 and 2, respectively, is determined as the CS parameter if orthogonal sequence values of +1 and +1 are identically allocated as the OCC to all the N layers,
   one of 101 and 110 indicating that the CS parameter values of the first layer are 8 and 10, respectively, is determined as the CS parameter if orthogonal sequence values of +1 and −1 are identically allocated as the OCC to all the N layers, and
   the CS parameters are determined to allocate different OCCs to two UEs, which are allocated different bandwidths and are in the MU-MIMO state.

8. A method for transmitting reference signals by a User Equipment (UE) including a processor, which generates and transmits reference signals for N layers (N is an integer), the method comprising:
   calculating, with a processor, a Cyclic Shift (CS) parameter value for a first layer from control information including a CS parameter received from an eNodeB;
   calculating, with a processor, a CS parameter value for each of other layers if the other layers are used in addition to the first layer;
   calculating, with a processor, an Orthogonal Cover Code (OCC) for the first layer from the CS parameter;
   calculating, with a processor, an OCC for each of the other layers if the other layers are used in addition to the first layer;
   generating a reference signal for the first layer by using the CS parameter value and the OCC for the first layer;
   generating a reference signal for each of the other layers by using the CS parameter value and the OCC for each of the other layers if the other layers are used in addition to the first layer; and
   transmitting the generated reference signal to the eNodeB,
   wherein the CS parameter is an element of a first set or a second set, an intersection between the first set and the second set is an empty set, and
   an OCC of a second layer is equal to an OCC of a first layer while an OCC of a third layer and a fourth layer is not equal to the OCC of the first layer if the CS parameter is an element of the first set, and
   one OCC is identically allocated to all the N layers if the CS parameter is an element of the second set.

9. The method of claim 8, wherein the CS parameter is expressed by 3 bits of information, which is 000, 001, 010, 011, 100, 101, 110, or 111 indicating that the CS parameter value of the first layer is 0, 6, 3, 4, 2, 8, 10, or 9, respectively, and
   CS parameters, which are elements of the first set, are expressed as 000, 001, 010, and 111 indicating that the CS parameter values of the first layer are 0, 6, 3, and 9, respectively, while CS parameters, which are elements of the second set, are expressed as 011, 100, 101, and 110 indicating that the CS parameter values of the first layer are 4, 2, 8, and 10, respectively.

10. The method of claim 9, wherein, among the CS parameters that are elements of the second set,
orthogonal sequence values of +1 and +1 are identically allocated as the OCC to all the N layers if the CS parameter is one of 011 and 100 indicating that the CS parameter values of the first layer are 4 and 2, respectively, and
orthogonal sequence values of +1 and −1 are identically allocated as the OCC to all the N layers if the CS parameter is one of 101 and 110 indicating that the CS parameter values of the first layer are 8 and 10, respectively.

11. An eNodeB apparatus to transmit a Cyclic Shift (CS) parameter to a User Equipment (UE), which generates and transmits reference signals for N layers (N is an integer), the eNodeB apparatus comprising:
a CS parameter determining unit to determine the CS parameter which implicitly indicates an Orthogonal Cover Code (OCC) used for generation of a reference signal for each layer;
a signal generating unit to generate a signal for transmitting control information including the determined CS parameter to the UE;
a transceiving unit to transmit the signal to the UE and to receive the reference signal from the UE; and
a processor to execute the CS parameter determining unit,
wherein the CS parameter determined by the CS parameter determining unit is an element of a first set or a second set, an intersection between the first set and the second set is an empty set, and
one element of the first set is determined as the CS parameter if a first OCC is identically allocated to a first layer and a second layer and a second OCC different from the first OCC is identically allocated to a third layer and a fourth layer, and
one element of the second set is determined as the CS parameter if one OCC is identically allocated to all the N layers.

12. The eNodB apparatus of claim 11, wherein the CS parameter is expressed by 3 bits of information, which is 000, 001, 010, 011, 100, 101, 110, or 111 indicating that the CS parameter value of the first layer is 0, 6, 3, 4, 2, 8, 10, or 9, respectively, and
CS parameters, which are elements of the first set, are expressed as 000, 001, 010, and 111 indicating that the CS parameter values of the first layer are 0, 6, 3, and 9, respectively, while CS parameters, which are elements of the second set, are expressed as 011, 100, 101, and 110 indicating that the CS parameter values of the first layer are 4, 2, 8, and 10, respectively.

13. The eNodeB apparatus of claim 12, wherein, among the CS parameters that are elements of the second set,
one of 011 and 100 indicating that the CS parameter values of the first layer are 4 and 2, respectively, is determined as the CS parameter if orthogonal sequence values of +1 and +1 are identically allocated as the OCC to all the N layers,
one of 101 and 110 indicating that the CS parameter values of the first layer are 8 and 10, respectively, is determined as the CS parameter if orthogonal sequence values of +1 and −1 are identically allocated as the OCC to all the N layers, and
the CS parameters are determined to allocate different OCCs to two UEs, which are allocated different bandwidths and are in the MU-MIMO state.

14. A User Equipment (UE) apparatus, which generates and transmits reference signals for N layers (N is an integer), the UE apparatus comprising:
a receiving unit to receive control information that comprises a Cyclic Shift (CS) parameter from an eNodeB;
a CS parameter extracting unit to calculate a CS parameter value for a first layer from the control information including the CS parameter, and to calculate a CS parameter value for each of other layers if the other layers are used in addition to the first layer;
an orthogonality-related information calculating unit to calculate orthogonality-related information for the first layer from the CS parameter, and to calculate orthogonality-related information for each of the other layers if the other layers are used in addition to the first layer;
a reference signal generating unit to generate a reference signal for the first layer by using the orthogonality-related information for the first layer and the CS parameter value for the first layer, and to generate a reference signal for each of the other layers by using orthogonality-related information for each of the other layers and the CS parameter value for each of the other layers if the other layers are used in addition to the first layer;
a transmitting unit to transmit the generated reference signal to the eNodeB; and
a processor to execute the CS parameter extracting unit, the orthogonality-related information calculating unit, and the reference signal generating unit,
wherein the CS parameter is an element of a first set or a second set, an intersection between the first set and the second set is an empty set, and
an Orthogonal Cover Code (OCC) of a second layer is equal to an OCC of a first layer while an OCC of a third layer and a fourth layer is not equal to the OCC of the first layer if the CS parameter is an element of the first set, and
one OCC is identically allocated to all the N layers if the CS parameter is an element of the second set.

15. The UE apparatus of claim 14, wherein the orthogonality-related information includes an OCC indicated by the CS parameter.

16. The UE apparatus of claim 14, wherein the CS parameter is expressed by 3 bits of information, which is 000, 001, 010, 011, 100, 101, 110, or 111 indicating that the CS parameter value of the first layer is 0, 6, 3, 4, 2, 8, 10, or 9, respectively, and
CS parameters, which are elements of the first set, are expressed as 000, 001, 010, and 111 indicating that the CS parameter value of the first layer are 0, 6, 3, and 9, respectively, while CS parameters, which are elements of the second set, are expressed as 011, 100, 101, and 110 indicating that the CS parameter values of the first layer are 4, 2, 8, and 10, respectively.

17. The UE apparatus of claim 16, wherein, among the CS parameters that are elements of the second set,
orthogonal sequence values of +1 and +1 are identically allocated as the OCC to all the N layers if the CS parameter is one of 011 and 100 indicating that the CS parameter values of the first layer are 4 and 2, respectively, and
orthogonal sequence values of +1 and −1 are identically allocated as the OCC to all the N layers if the CS parameter is one of 101 and 110 indicating that the CS parameter values of the first layer are 8 and 10, respectively.

* * * * *